(12) United States Patent
Liang et al.

(10) Patent No.: US 12,408,176 B2
(45) Date of Patent: Sep. 2, 2025

(54) COMMUNICATION SYSTEM

(71) Applicant: NEC Corporation, Tokyo (JP)

(72) Inventors: Caroline Liang, London (GB); Takahiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/626,578

(22) PCT Filed: Jul. 30, 2021

(86) PCT No.: PCT/JP2021/028468
§ 371 (c)(1),
(2) Date: Jan. 12, 2022

(87) PCT Pub. No.: WO2022/030412
PCT Pub. Date: Feb. 10, 2022

(65) Prior Publication Data
US 2023/0319830 A1 Oct. 5, 2023

(30) Foreign Application Priority Data
Aug. 7, 2020 (GB) ..................................... 2012353

(51) Int. Cl.
*H04W 72/23* (2023.01)
*H04L 27/26* (2006.01)
*H04W 72/231* (2023.01)

(52) U.S. Cl.
CPC ....... *H04W 72/23* (2023.01); *H04L 27/26025* (2021.01); *H04W 72/231* (2023.01)

(58) Field of Classification Search
None
See application file for complete search history.

(56) References Cited

U.S. PATENT DOCUMENTS

| | | | |
|---|---|---|---|
| 2019/0150073 A1 | 5/2019 | Tiirola et al. | |
| 2019/0223199 A1* | 7/2019 | Park | H04L 1/1861 |
| 2019/0306700 A1* | 10/2019 | Lin | H04W 72/23 |
| 2020/0037184 A1* | 1/2020 | Harada | H04L 5/0053 |
| 2020/0045696 A1 | 2/2020 | Huang et al. | |
| 2020/0092813 A1 | 3/2020 | Kim et al. | |
| 2021/0195526 A1 | 6/2021 | Kim et al. | |
| 2022/0007361 A1 | 1/2022 | Huang et al. | |

(Continued)

FOREIGN PATENT DOCUMENTS

| | | |
|---|---|---|
| CN | 109802758 A | 5/2019 |
| CN | 110035511 A | 7/2019 |
| CN | 110612692 A | 12/2019 |

(Continued)

OTHER PUBLICATIONS

International Searching Authority for PCT Application No. PCT/JP2021/028468, mailed on Nov. 16, 2021.

(Continued)

*Primary Examiner* — Jutai Kao
(74) *Attorney, Agent, or Firm* — Sughrue Mion, PLLC

(57) ABSTRACT

A method is disclosed in which downlink control information transmitted by a radio access network provides an indication of at least one set of control resources configured at a UE, or of at least one search space configured at a UE, that the UE is to stop monitoring for DCI, start monitoring for DCI, or continue monitoring for DCI.

8 Claims, 17 Drawing Sheets

(56) References Cited

U.S. PATENT DOCUMENTS

2022/0264459 A1    8/2022    Kim et al.

FOREIGN PATENT DOCUMENTS

| CN | 110784926 | A | 2/2020 |
| CN | 111066371 | A | 4/2020 |
| KR | 20200031446 | A | 3/2020 |
| WO | 2019/143164 | A1 | 7/2019 |
| WO | 2020/033652 | A1 | 2/2020 |

OTHER PUBLICATIONS

GB Office Action for GB Application No. GB2012353.5, mailed on May 11, 2021.

3GPP Draft, vol. RAN WG1, 2020, VIVO et al, "Reduced PDCCH monitoring for Reduced Capability NR devices", R1-2003432, pp. 1-5.

3GPP Draft, vol. RAN WG2, 2020, Interdigital Inc, "Reduced PDCCH monitoring for Reduced Capability NR devices", R1-2004315, pp. 1-3.

3GPP Draft, vol. RAG WG1, 2017, Interdigital Inc, "Control Channels Monitoring with Multiple CORESETs", R1-1709016, pp. 1-3.

ETSI Technical Specification, vol. 3GPP RAN, 2020, "5G; NR; Physical layer procedures for control (3GPP TS 38.213 Version 16.2.0 Release 16)", pp. 1-180.

3GPP TSG RAN WG #102-e, e-Meeting, NEC, "Reduced PDCCH monitoring for REDCAP NR devices", R1-2005778, pp. 1-4.

NGMN, "NGMN 5G White Paper", V1.0, Feb. 17, 2015, pp. 1-125.

International Search Report for PCT Application No. PCT/JP2021/028468, mailed on Mar. 1, 2022.

Written opinion for PCT Application No. PCT/JP2021/028468, mailed on Mar. 1, 2022.

FUTUREWEI: "Power Savings for RedCap", 3GPP Draft, R1-2003546, May 15, 2020 (May 15, 2020).

Mediatek Inc: "UE assistance information for power saving", 3GPP Draft, R2-1910083, Aug. 15, 2019 (Aug. 15, 2019).

NEC: "View on reduced PDCCH monitoring for NR devices", 3GPP Draft, R1-2003711, May 15, 2020 (May 15, 2020).

JP Office Action for Japanese Patent Application No. 2023-092093, mailed on Apr. 23, 2024 with English Translation.

ZTE, Sanechips, "Remaining issues for slot format", 3GPP TSG RAN WG1 adhoc_NR_AH_1801 R1-1800992, 3GPP, Jan. 15, 2018.

Huawei, HiSilicon, "Remaining aspects on pre-emption indication for DL multiplexing of URLLC and eMBB", 3GPP TSG RAN WG1#91 R1-1721452, 3GPP, Nov. 28, 2017.

CN Office Action for CN Application No. 202180058055.6, mailed on Jun. 27, 2024 with English Translation.

CN Official Communication for CN Application No. 202180058055.6, mailed on Jan. 13, 2025 with English Translation.

\* cited by examiner

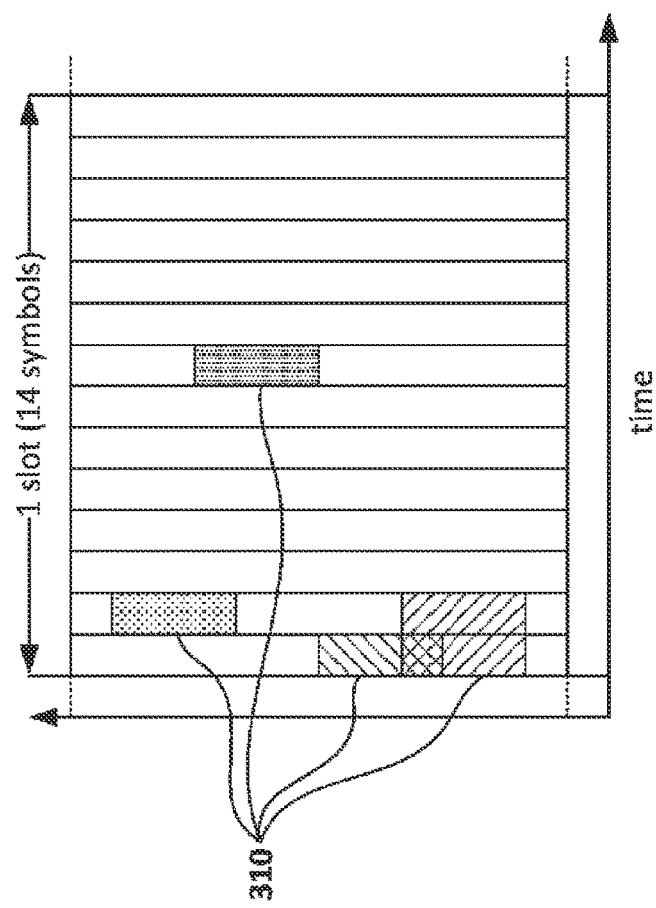

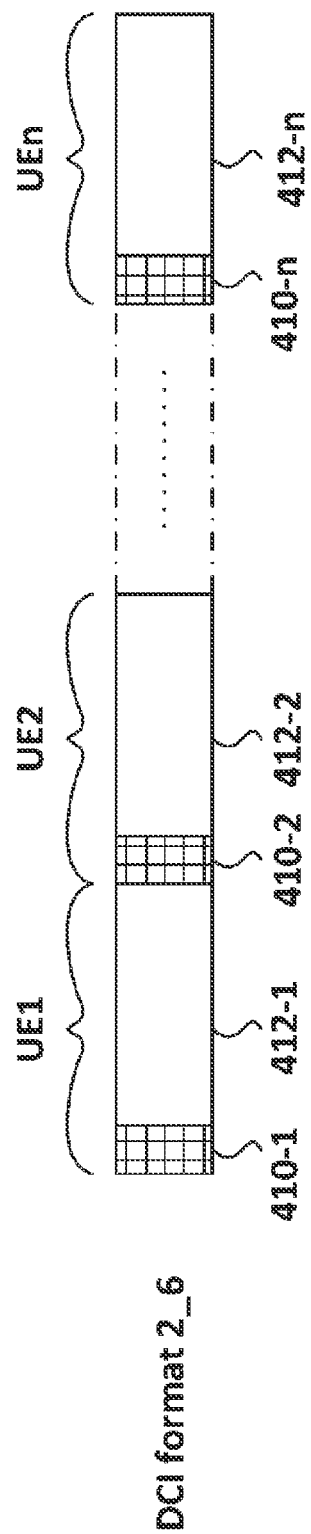

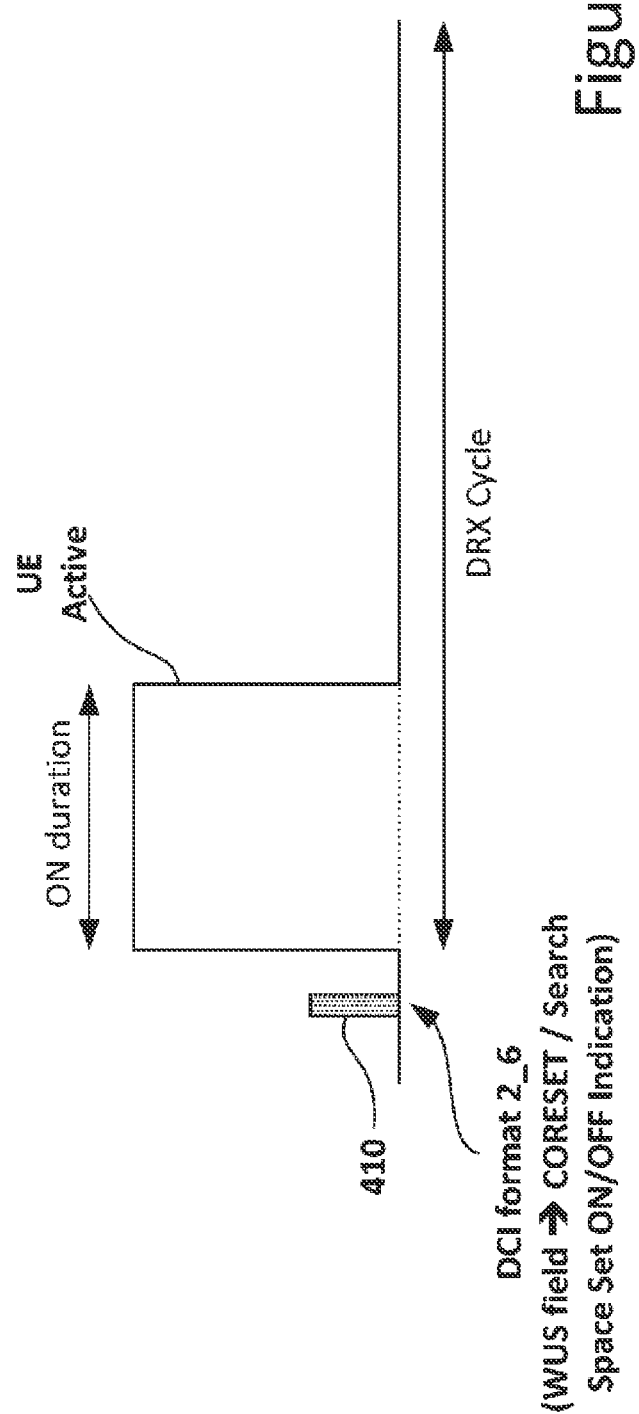

COMMUNICATION SYSTEM

This application is a National Stage Entry of PCT/JP2021/028468 filed on Jul. 30, 2021, which claims priority from Great Britain Patent Application GB2012353.5 filed on Aug. 7, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to, improved apparatus and methods that support flexible monitoring for the transmission of control information in a downlink control channel (e.g., a physical downlink control channel (PDCCH)).

BACKGROUND ART

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations.

In the current 5G architecture, for example, the gNB structure may be split into two parts known as the Central Unit (CU) and the Distributed Unit (DU), connected by an F1 interface. This enables the use of a 'split' architecture, whereby the, typically 'higher', CU layers (for example, but not necessarily or exclusively), PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally, in each of the gNB.

For simplicity, the present application will use the term mobile device, user device, or UE to refer to any communication device that is able to connect to the core network via one or more base stations. Although the present application often refers to mobile devices in the description, it will be appreciated that the technology described can be implemented on any communication devices (mobile and/or generally stationary) that can connect to a communications network for sending/receiving data, regardless of whether such communication devices are controlled by human input or software instructions stored in memory.

In 5G, the concept of a control resource set (CORESET) has been introduced. A CORESET is a set of time-frequency resources with which a UE can search for downlink control information (DCI) transmitted by a base station on a PDCCH. A CORESET is analogous to the control region at the start LTE subframes. However, unlike LTE, in which the frequency domain of the control region corresponds to the total system bandwidth, the frequency domain location for CORESET is localised to a specific region in frequency domain and has a variable width can be set to any suitable value (in the multiples of 6 resource blocks where each resource block comprises 12 subcarriers in the frequency domain).

A base station may transmit control information for a specific UE in a PDCCH that uses the resources of a UE specific CORESET defined for that UE. The PDCCH is made up of a number of control channel elements (CCEs) depending on the required aggregation level (L). Each CCE comprises a set of time/frequency resource comprising bundles of resource element groups, each group comprising a number of resource elements.

Allowing different UEs to be assigned different resource sets for their dedicated PDCCH signalling reduces but does not eliminate the probability of PDCCH blocking events in which there are no CCEs free for scheduling a given UE, at a particular aggregation level, in that UEs search space.

A number of different DCI formats can be used for transmission on a PDCCH and the transmitted format is unknown to the UE in advance. Accordingly, the UE typically needs to make multiple blind attempts to detect a DCI format. Whilst the CCE and CORESET structure helps in reducing the number of blind decoding attempts required this is not sufficient to reduce the number of blind decoding attempts to a practical level. To alleviate this issue, whilst still providing the base station with scheduling flexibility, a discrete number of search spaces are defined in which a UE is to search possible PDCCH resource locations (PDCCH 'candidates') for DCI. Each search space is a set of candidate PDCCHs formed by CCEs at a given aggregation level, which the UE can attempt to decode.

As there are a number of different possible aggregation levels there can be several search spaces for a given CORESET and, as there can be a number of CORESETs, the number of blind decoding attempts can still be relatively high. Thus, the respective number of PDCCH candidates for each PDCCH search space set is also configurable to allow blind decoding attempts to be spread across the search spaces for different aggregation levels.

Each PDCCH search space set can form a UE specific search space (USS) configured for a single UE, or a common search space (CSS), which is similar in structure to a USS but which has a set of CCEs that are predefined and hence known to all UEs.

Typically, at least the following five PDCCH search space sets are configured to support of the basic communication functionalities:

A common search space set for system information block type 1 (SIB1),
A common search space set for other system information,
A common search space set for RACH,
A common search space set for paging, and
A UE-specific search space set for data transmission and reception.

Before a UE can attempt to decode a PDCCH candidate the UE must first perform channel estimation needs to be performed based on demodulation reference signals (DMRS) transmitted in the CCEs forming the PDCCH candidate. The number of PDCCH DMRS used to perform channel estimation depends on the number of CCEs forming the PDCCH candidate.

In order to reduce device complexity both the maximum number of blind decoding attempts that a UE is permitted to perform, and the number of CCEs on which channel estimation is performed, are limited depending on the subcarrier spacing and hence the slot duration. When a UE is searching for control information any unsearched PDCCH candidates will be skipped (or 'dropped') when either the number of blind decodes, or the number of CCEs, exceeds the maximum defined for the UE. This means that in some circumstances not all search spaces will be searched and so a rule is used to determine which search spaces should be searched first. According to this rule, common search space sets are prioritised over UE-specific search space sets, and UE-specific search space sets are prioritised based on their identities, with a USS having a smaller index being prioritised over a USS having a larger index.

At 3GPP Technical Standards Group (TSG) RAN Meeting #86, a new study was initiated for developing so called reduced capability ('RedCap' or 'REDCAP') UEs for a number of specific use cases including, but not limited to, industrial wireless sensing, video surveillance and wearable devices.

REDCAP UEs will typically: have a significantly reduced device complexity, compared to the high-end enhanced mobile broadband (eMBB) and ultra-reliable low-latency communication (URLLC) devices of earlier releases (especially for industrial sensors); support a reduced device size since most use cases require the capability for a device design with compact form factor; and support all the frequency bands of both 5G frequency ranges (i.e., FR1 and FR2) for both frequency division duplex (FDD) and time division duplex (TDD).

Each of the different use cases for REDCAP UEs has differing technical requirements making the design of communication protocols and apparatus that support REDCAP UEs more challenging. For example, the requirements for some of the key use cases may be summarised as follows:
Industrial Wireless Sensors Communication service availability should ideally be at least 99.99% and end-to-end latency less than 100 ms. The reference bit rate should ideally be less than 2 Mbps (potentially uplink/downlink asymmetric e.g., because of uplink (UL) heavy traffic) for all use cases and the device is stationary. The battery should ideally last at least few years. For safety related sensors, the latency requirement may be lower, for example 5-10 ms.
Video Surveillance Reference economic video bitrate capability would ideally be in the range 2-4 Mbps. Latency should ideally be less than 500 ms. Reliability should ideally be 99%-99.9%. High-end video, e.g., for farming, could require higher video bitrate capability in the range 7.5-25 Mbps. Traffic pattern dominated by UL transmissions should be supported.

Wearables Reference bitrate for smart wearable application capability would ideally be in the range 5-50 Mbps in downlink (DL) and 2-5 Mbps in UL. Peak bit rate capability of the device should ideally be higher—in the range 10-150 Mbps for DL and 5-50 Mbps for UL. The battery of the device should last multiple days (up to 1-2 weeks).

It can be seen that, for REDCAP UEs, power saving is an important design aspect, for example due to the smaller form factor and longer battery lifetime requirements. To help support such power saving, therefore, REDCAP UEs will typically have a reduced capability to monitor for control information on the PDCCH with tighter limits on the number of allowed blind decoding attempts and the maximum number of CCEs that can be subject to channel estimation.

Some REDCAP UEs may not support the usage of small aggregation levels, such as L=1 or L=2, while others may not be able to support high aggregation levels, e.g., L=16 due to bandwidth limitations.

Moreover, the PDCCH blocking probability may increase due to the potentially reduced bandwidth, potentially larger aggregation levels and/or potentially reduced number of CCEs that may be used for REDCAP UEs.

SUMMARY OF INVENTION

The invention aims to provide improved apparatus and methods that overcome or at least partially ameliorates the above issues.

Example aspects of the invention are set out in the appended independent claims. Optional but beneficial features are set out in the appended dependent claims.

According to one example aspect there is provided a method performed by a user equipment (UE) that communicates with a radio access network in a communication system, the method comprising: receiving, from the radio access network, first information for configuring at least one set of control resources in which the radio access network may transmit control information, and second information for configuring at least one search space within the set of control resources within which to search for control information; monitoring for downlink control information (DCI) transmitted by the radio access network within the at least one search space within the at least one set of control resources; receiving, from the radio access network, DCI comprising third information for reconfiguring the at least one set of control resources configured by the first information, or the at least one search space configured by the second information; and monitoring for DCI transmitted by the radio access network within the at least one search space within the set of control resources as reconfigured by the third information; wherein the third information is configured to provide an indication of at least one set of control resources configured by the first information, or of at least one search space configured by the second information, within which the UE is to stop monitoring for DCI, start monitoring for DCI, or continue monitoring for DCI.

According to one example aspect there is provided a method performed by a user equipment (UE) that communicates with a radio access network in a communication system, the method comprising: obtaining information for mapping each of a plurality of possible power saving configurations to a set of parameters that characterise that power configuration; and providing, to the radio access network, UE assistance information comprising an indication of at least one power saving configuration, of the plurality of power saving configurations, that represents a configuration or capability of the UE.

According to one example aspect there is provided a method performed by a user equipment (UE) that communicates with a radio access network in a communication system, the method comprising: monitoring, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element and each search space comprises a respective set of physical downlink control channel (PDCCH) candidates within which to search for DCI; wherein the monitoring comprises, during a current slot of the monitoring occasion: (a) treating a first search space of the plurality of search spaces that has not been searched in the current slot as a current search space and attempting to blind decode each PDCCH candidate of the current search space in turn until an end to searching of the current search space is triggered; (b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and (c) when an end to searching in the current slot is triggered, repeating steps (a) to (c) during a subsequent slot of a monitoring occasion as the current slot, until an end to searching in the monitoring occasion is triggered; wherein, before performing step (b), at least one USS is assigned to be a highest priority USS for the current slot; wherein, when selecting a search space to be searched next in step (b) the UE prioritises the remaining search spaces that have not been searched in the current slot based on based on a prioritisation scheme that requires that USSs are prioritised starting from a USS having a highest priority; and wherein the method further comprises, before repeating steps (a) to (c) during a subsequent slot of the monitoring occasion, reassigning a different USS to be highest priority USS.

According to one example aspect there is provided a method performed by a user equipment (UE) that communicates with a radio access network in a communication system, the method comprising: monitoring, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element (CCE) and each search space comprises a respective set of physical downlink control channel (PDCCH) candidates within which to search for DCI, each PDCCH candidate comprising at least one CCE; wherein the monitoring comprises, during a current slot of the monitoring occasion: (a) treating a first search space of the plurality of search spaces that has not been searched in the current slot as a current search space and attempting to blind decode each PDCCH candidate of the current search space in turn until an end to searching of the current search space is triggered; (b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and (c) when an end to searching in the current slot is triggered, repeating steps (a) to (c) during a subsequent slot of a monitoring occasion as the current slot, until an end to searching in the monitoring occasion is triggered; wherein, the UE is configured with a maximum number of blind decode attempts, and an end to searching in the current slot is triggered when the maximum number of blind decode attempts will be exceeded if searching contin-ues; wherein, the UE is configured with a maximum share of the maximum number of blind decode attempts that can be used for searching CSSs; and wherein, when selecting a search space to be searched next in step (b) the UE prioritises the remaining search spaces that have not been searched in the current slot based on a prioritisation scheme that requires that CSSs that have not been searched in the current slot are prioritised until further searching in a CSS will cause the maximum share of the maximum number of blind decode attempts to be exceeded, after which USSs that have not been searched in the current slot are prioritised.

According to one example aspect there is provided a method performed by a user equipment (UE) that communicates with a radio access network in a communication system, the method comprising: monitoring, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element (CCE) and each search space comprises a respective set of physical downlink control channel (PDCCH) candidates within which to search for DCI, each PDCCH candidate comprising at least one CCE; wherein the monitoring comprises, during a current slot of the monitoring occasion: (a) treating a first search space of the plurality of search spaces that has not been searched in the current slot as a current search space and attempting to blind decode each PDCCH candidate of the current search space in turn until an end to searching of the current search space is triggered; (b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and (c) when an end to searching in the current slot is triggered, repeating steps (a) to (c) during a subsequent slot of a monitoring occasion as the current slot, until an end to searching in the monitoring occasion is triggered; wherein, the UE is configured with a maximum number of blind decode attempts, and an end to searching in the current search space and the current slot is triggered when the maximum number of blind decode attempts will be exceeded if searching continues, even when the current search space has not been fully searched.

According to one example aspect there is provided a method performed by a user equipment (UE) that communicates with a radio access network in a communication system, the method comprising: identifying a sequence of consecutive slots for forming a monitoring occasion; and monitoring, during the monitoring occasion, for downlink control information (DCI) transmitted by the radio access network within a plurality of search spaces, within at least one set of control resources; wherein, when performing the monitoring, the UE monitors for control information in slots of the sequence of consecutive slots that are spaced apart by an unmonitored interval of at least one other slot of the sequence of consecutive slots.

According to one example aspect there is provided a user equipment (UE) for communicating with a radio access network in a communication system, the UE comprising: a controller and a transceiver, wherein the controller is configured to control the transceiver to: receive, from the radio access network, first information for configuring at least one set of control resources in which the radio access network may transmit control information, and second information for configuring at least one search space within the set of control resources within which to search for control information; monitor for downlink control information (DCI) transmitted by the radio access network within the at least one search space within the at least one set of control resources; receive, from the radio access network, DCI comprising third information for reconfiguring the at least one set of control resources configured by the first information, or the at least one search space configured by the second information; and monitor for DCI transmitted by the radio access network within the at least one search space within the set of control resources as reconfigured by the third information; wherein the third information is configured to provide an indication of at least one set of control resources configured by the first information, or of at least one search space configured by the second information, within which the UE is to stop monitoring for DCI, start monitoring for DCI, or continue monitoring for DCI.

According to one example aspect there is provided a user equipment (UE) for communicating with a radio access network in a communication system, the UE comprising: a controller and a transceiver, wherein the controller is configured: to obtain information for mapping each of a plurality of possible power saving configurations to a set of parameters that characterise that power configuration; and to control the transceiver to provide, to the radio access network, UE assistance information comprising an indication of at least one power saving configuration, of the plurality of power saving configurations, that represents a configuration or capability of the UE.

According to one example aspect there is provided a user equipment (UE) for communicating with a radio access network in a communication system, the UE comprising: a controller and a transceiver, wherein the controller is configured to control the transceiver to: monitor, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element and each search space comprises a respective set of physical downlink control channel (PDCCH) candidates within which to search for DCI; wherein the controller is configured to control the UE, during a current slot of the monitoring occasion, to: (a) treat a first search space of the plurality of search spaces that has not been searched in the current slot as a current search space and attempt to blind decode each PDCCH candidate of the current search space in turn until an end to searching of the current search space is triggered; (b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and (c) when an end to searching in the current slot is triggered, repeat steps (a) to (c) during a subsequent slot of a monitoring occasion as the current slot, until an end to searching in the monitoring occasion is triggered; wherein, before performing step (b), at least one USS is assigned to be a highest priority USS for the current slot; wherein the controller is configured to control the UE to, when selecting a search space to be searched next in step (b), prioritise the remaining search spaces that have not been searched in the current slot based on based on a prioritisation scheme that requires that USSs are prioritised starting from a USS having a highest priority; and wherein the controller is configured to control the UE to, before repeating steps (a) to (c) during a subsequent slot of the monitoring occasion, reassign a different USS to be highest priority USS.

According to one example aspect there is provided a user equipment (UE) for communicating with a radio access network in a communication system, the UE comprising: a controller and a transceiver, wherein the controller is configured to control the transceiver to: monitor, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element and each search space comprises a respective set of physical downlink control channel (PDCCH) candidates within which to search for DCI; wherein the controller is configured to control the UE, during a current slot of the monitoring occasion, to: (a) treat a first search space of the plurality of search spaces that has not been searched in the current slot as a current search space and attempt to blind decode each PDCCH candidate of the current search space in turn until an end to searching of the current search space is triggered; (b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and (c) when an end to searching in the current slot is triggered, repeat steps (a) to (c) during a subsequent slot of a monitoring occasion as the current slot, until an end to searching in the monitoring occasion is triggered; wherein, the UE is configured with a maximum number of blind decode attempts, and an end to searching in the current slot is triggered when the maximum number of blind decode attempts will be exceeded if searching continues; wherein, the UE is configured with a maximum share of the maximum number of blind decode attempts that can be used for searching CSSs; and wherein the controller is configured to control the UE to, when selecting a search space to be searched next in step (b), UE prioritise the remaining search spaces that have not been searched in the current slot based on a prioritisation scheme that requires that CSSs that have not been searched in the current slot are prioritised until further searching in a CSS will cause the maximum share of the maximum number of blind decode attempts to be exceeded, after which USSs that have not been searched in the current slot are prioritised.

According to one example aspect there is provided a user equipment (UE) for communicating with a radio access network in a communication system, the UE comprising: a controller and a transceiver, wherein the controller is configured to control the transceiver to: monitor, during a monitoring occasion, for downlink control information (DCI) transmitted by the radio access network within a plurality of search spaces, comprising at least one common search space (CSS) and at least on UE specific search space (USS), within at least one set of control resources; wherein the set of control resources comprise at least one control channel element and each search space comprises a respective set of physical downlink control channel (PDCCH) candidates within which to search for DCI; wherein the controller is configured to control the UE, during a current slot of the monitoring occasion, to: (a) treat a first search space of the plurality of search spaces that has not been searched in the current slot as a current search space and attempt to blind decode each PDCCH candidate of the current search space in turn until an end to searching of the current search space is triggered; (b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and (c) when an end to searching in the current slot is triggered, repeat steps (a) to (c) during a subsequent slot of a monitoring occasion as the current slot, until an end to searching in the monitoring occasion is triggered; wherein, the UE is configured with a maximum number of blind decode attempts, and an end to searching in the current search space and the current slot is triggered when the maximum number of blind decode attempts will be exceeded if searching continues, even when the current search space has not been fully searched.

According to one example aspect there is provided a user equipment (UE) for communicating with a radio access network in a communication system, the UE comprising: a controller and a transceiver, wherein the controller is configured to identify a sequence of consecutive slots for forming a monitoring occasion, and to control the transceiver to monitor, during the monitoring occasion, for downlink control information (DCI) transmitted by the radio access network within a plurality of search spaces, within at least one set of control resources; wherein the controller is configured to control the UE to monitor for control information in slots of the sequence of consecutive slots that are spaced apart by an unmonitored interval of at least one other slot of the sequence of consecutive slots.

According to one example aspect there is provided a method performed by a radio access network that communicates with a user equipment (UE) in a communication system, the method comprising: transmitting, to the UE, first information for configuring at least one set of control resources in which the radio access network may transmit control information, and second information for configuring at least one search space within the set of control resources within which to search for control information; and transmitting, to the UE, from the radio access network, DCI comprising third information for reconfiguring the at least one set of control resources configured by the first information, or the at least one search space configured by the second information; wherein the third information is configured to provide an indication of at least one set of control resources configured by the first information, or of at least one search space configured by the second information, within which the UE is to stop monitoring for DCI, start monitoring for DCI, or continue monitoring for DCI.

According to one example aspect there is provided a method performed by a radio access network that communicates with a user equipment (UE) in a communication system, the method comprising: obtaining information for mapping each of a plurality of possible power saving configurations to a set of parameters that characterise that power configuration; receiving, from the UE, UE assistance information comprising an indication of at least one power saving configuration, of the plurality of power saving configurations, that represents a configuration or capability of the UE; and configuring communication with the UE based on the received UE assistance information.

According to one example aspect there is provided a method performed by a radio access network that communicates with a user equipment (UE) in a communication system, the method comprising: transmitting, to the UE, information for configuring at least one set of control resources in which the radio access network may transmit control information, and second information for configuring a plurality of search spaces, comprising at least on UE specific search space (USS), within at least one set of control resources, wherein the information comprises information for configuring a maximum share of a maximum number of blind decode attempts that can be used by the UE for searching a common search space (CSSs).

According to one example aspect there is provided a method performed by a radio access network that communicates with a user equipment (UE) in a communication system, the method comprising: transmitting, to the UE, information indicating a sequence of consecutive slots for forming a monitoring occasion, wherein the information comprises information for indicating an interval between slots of the sequence of consecutive slots that is to remain unmonitored by the UE.

According to one example aspect there is provided a radio access network node for communicating with a user equipment (UE) in a communication system, the radio access network node comprising: a controller and a transceiver, wherein the controller is configured to control the transceiver to: transmit, to the UE, first information for configuring at least one set of control resources in which the radio access network may transmit control information, and second information for configuring at least one search space within the set of control resources within which to search for control information; and transmit, to the UE, from the radio access network, DCI comprising third information for reconfiguring the at least one set of control resources configured by the first information, or the at least one search space configured by the second information; wherein the third information is configured to provide an indication of at least one set of control resources configured by the first information, or of at least one search space configured by the second information, within which the UE is to stop monitoring for DCI, start monitoring for DCI, or continue monitoring for DCI.

According to one example aspect there is provided a radio access network node for communicating with a user equipment (UE) in a communication system, the radio access network node comprising: a controller and a transceiver, wherein the controller is configured: to obtain information for mapping each of a plurality of possible power saving configurations to a set of parameters that characterise that power configuration; to control the transceiver to receive, from the UE, UE assistance information comprising an indication of at least one power saving configuration, of the plurality of power saving configurations, that represents a configuration or capability of the UE; and to configure communication with the UE based on the received UE assistance information.

According to one example aspect there is provided a radio access network node for communicating with a user equipment (UE) in a communication system, the radio access network node comprising: a controller and a transceiver, wherein the controller is configured to control the transceiver to transmit, to the UE, information for configuring at least one set of control resources in which the radio access network may transmit control information, and second information for configuring a plurality of search spaces, comprising at least on UE specific search space (USS), within at least one set of control resources, wherein the information comprises information for configuring a maximum share of a maximum number of blind decode attempts that can be used by the UE for searching a common search space (CSSs).

According to one example aspect there is provided a radio access network node for communicating with a user equipment (UE) in a communication system, the radio access network node comprising: a controller and a transceiver, wherein the controller is configured to control the transceiver to transmit, to the UE, information indicating a sequence of consecutive slots for forming a monitoring occasion, wherein the information comprises information for indicating an interval between slots of the sequence of consecutive slots that is to remain unmonitored by the UE.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which:

FIG. 3A is a simplified illustration of a slot comprising a plurality of CORESETS in the telecommunication system of FIG. 1;

FIG. 4B is a simplified illustration of the contents of a DCI format for notifying the power saving information outside of a DRX active time;

FIG. 7A is a simplified illustration of a DRX cycle in which a wake-up signal is used to indicate whether or a UE should become active;

DESCRIPTION OF EMBODIMENTS

Overview

An exemplary telecommunication system will now be described, by way of example only, with reference to FIGS. 1 to 4.

Figure 1:
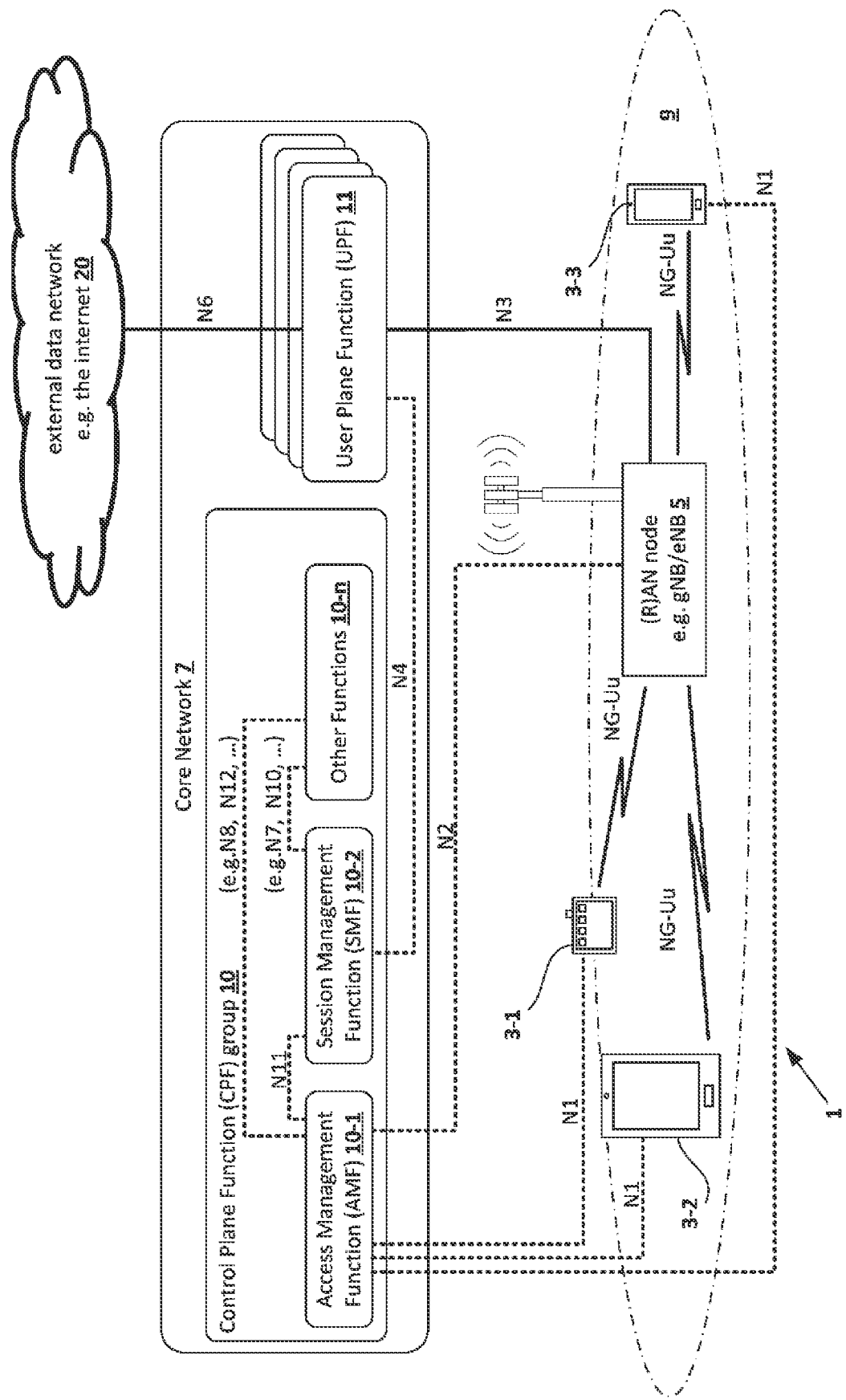
FIG. 1 schematically illustrates a mobile ('cellular' or 'wireless') telecommunication system of FIG. 1.

FIG. 1 schematically illustrates a mobile ('cellular' or 'wireless') telecommunication system 1 to which example embodiments of the present invention are applicable.

In the network 1 user equipment (UEs) 3-1, 3-2, 3-3 (e.g., mobile telephones and/or other mobile devices) can communicate with each other via base stations 5 can communicate with each other via a radio access network (RAN) node 5 that operates according to one or more compatible radio access technologies (RATs). In the illustrated example, the RAN node 5 comprises a NR/5G base station or 'gNB' 5 operating one or more associated cells 9. Communication via the base station 5 is typically routed through a core network 7 (e.g., a 5G core network or evolved packet core network (EPC)).

As those skilled in the art will appreciate, whilst three UEs 3 and one base station 5 are shown in FIG. 1 for illustration purposes, the system, when implemented, will typically include other base stations and UEs.

Each base station 5 controls the associated cell(s) either directly, or indirectly via one or more other nodes (such as home base stations, relays, remote radio heads, distributed units, and/or the like). It will be appreciated that the base stations 5 may be configured to support both 4G and 5G, and/or any other 3GPP or non-3GPP communication protocols.

The UEs 3 and their serving base station 5 are connected via an appropriate air interface (for example the so-called 'Uu' interface and/or the like). Neighbouring base stations 5 may be connected to each other via an appropriate base station to base station interface (such as the so-called 'X2' interface, 'Xn' interface and/or the like).

The core network 7 includes a number of logical nodes (or 'functions') for supporting communication in the telecommunication system 1. In this example, the core network 7 comprises control plane functions (CPFs) 10 and one or more user plane functions (UPFs) 11. The CPFs 10 include one or more Access and Mobility Management Functions (AMFs) 10-1, one or more Session Management Functions (SMFs) and a number of other functions 10-n.

The base station 5 is connected to the core network nodes via appropriate interfaces (or 'reference points') such as an N2 reference point between the base station 5 and the AMF 10-1 for the communication of control signalling, and an N3 reference point between the base station 5 and each UPF 11 for the communication of user data. The UEs 3 are each connected to the AMF 10-1 via a logical non-access stratum (NAS) connection over an N1 reference point (analogous to the S1 reference point in LTE). It will be appreciated, that N1 communications are routed transparently via the base station 5.

The UPF(s) 11 are connected to an external data network (e.g., an IP network such as the internet) via reference point N6 for communication of the user data.

The AMF 10-1 performs mobility management related functions, maintains the non-NAS signalling connection with each UE 3 and manages UE registration. The AMF 10-1 is also responsible for managing paging. The SMF 10-2 provides session management functionality (that formed part of MME functionality in LTE) and additionally combines some control plane functions (provided by the serving gateway and packet data network gateway in LTE). The SMF 10-2 also allocates IP addresses to each UE 3.

In this example, one of the UEs 3-1 is a so called reduced capability (REDCAP) UE, for example a UE having a reduced device complexity (compared to the high-end enhanced mobile broadband (eMBB) and ultra-reliable low-latency communication (URLLC) devices of earlier releases, that supports a compact form factor, and that supports the frequency bands of FR1 and FR2 for both FDD TDD.

Figure 2:
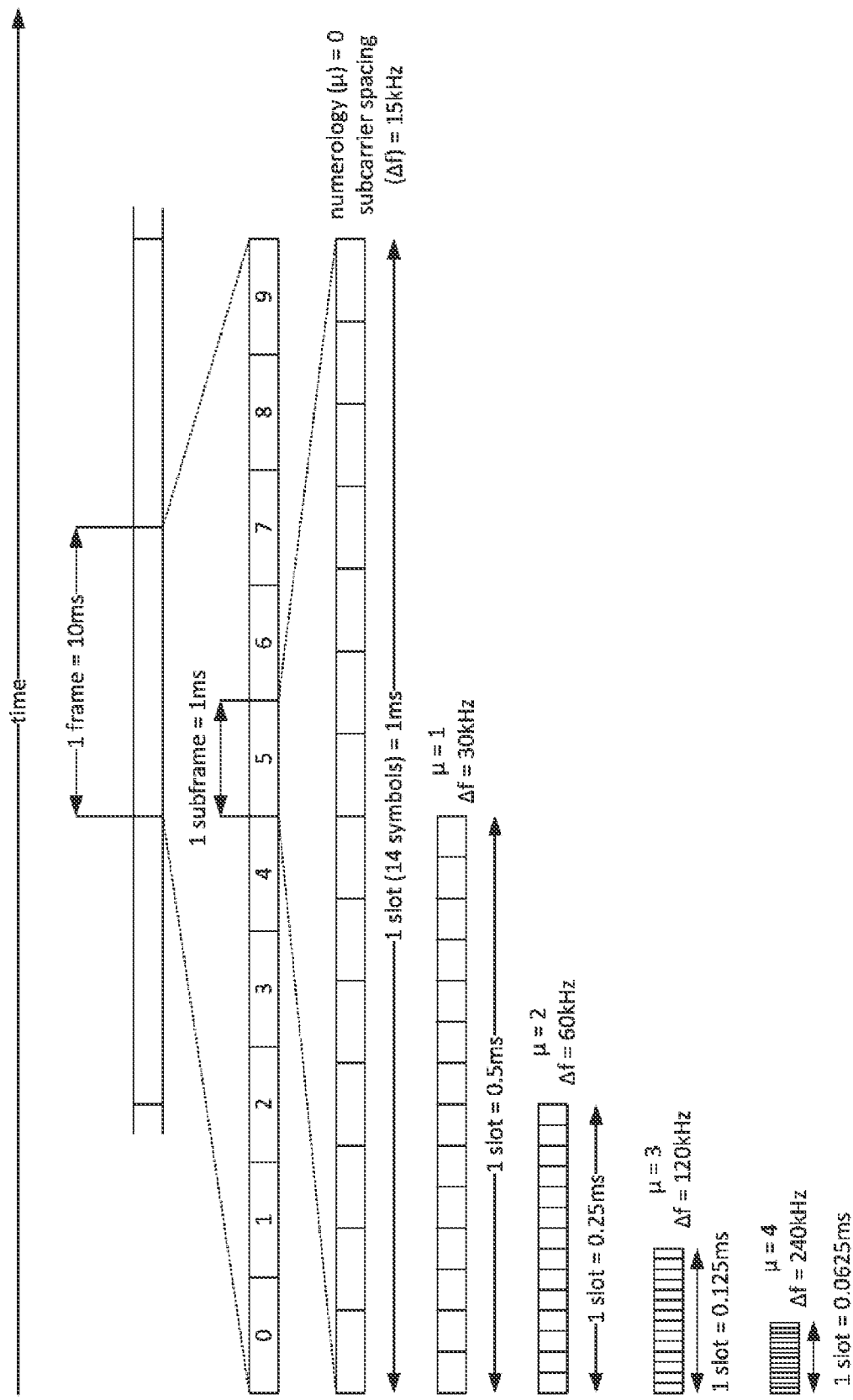
FIG. 2 illustrates a typical frame structure that may be used in the telecommunication system of FIG. 1.

Referring to FIG. 2, which illustrates the typical frame structure that may be used in the telecommunication system 1, the base station 5 and UEs 3 of the telecommunication system 1 communicate with one another using resources that are organised, in the time domain, into frames of length 10 ms. Each frame comprises ten equally sized subframes of 1 ms length. Each subframe is divided into one or more slots comprising 14 Orthogonal frequency-division multiplexing (OFDM) symbols of equal length.

[Math. 1]

As seen in FIG. 2, the telecommunication system 1 supports mule different numerologies (subcarrier spacing (SCS), slot lengths and hence OFDM symbol lengths). Specifically, each numerology is identified by a parameter, $\mu$, where $\mu=0$ represents 15 kHz (corresponding to the LTE SCS). Current, the SOS for other values of $\mu$ can, in effect, be derived from $\mu=0$ by scaling up in powers of 2 (i.e., SOS $15\times2^\mu$KHz) The relationship between the parameter, $\mu$, and SOS ($\Delta f$) is as shown in Table 1:

[Table 1]

TABLE 1

| | 5G Numerology | | |
|---|---|---|---|
| $\mu$ | $\Delta f = 2^\mu \cdot 15$ [kHz] | Number of slots per subframe | Slot length (ms) |
| 0 | 15 | 1 | 1 |
| 1 | 30 | 2 | 0.5 |
| 2 | 60 | 4 | 0.25 |
| 3 | 120 | 8 | 0.125 |
| 4 | 240 | 16 | 0.0625 |

Figure 3B:
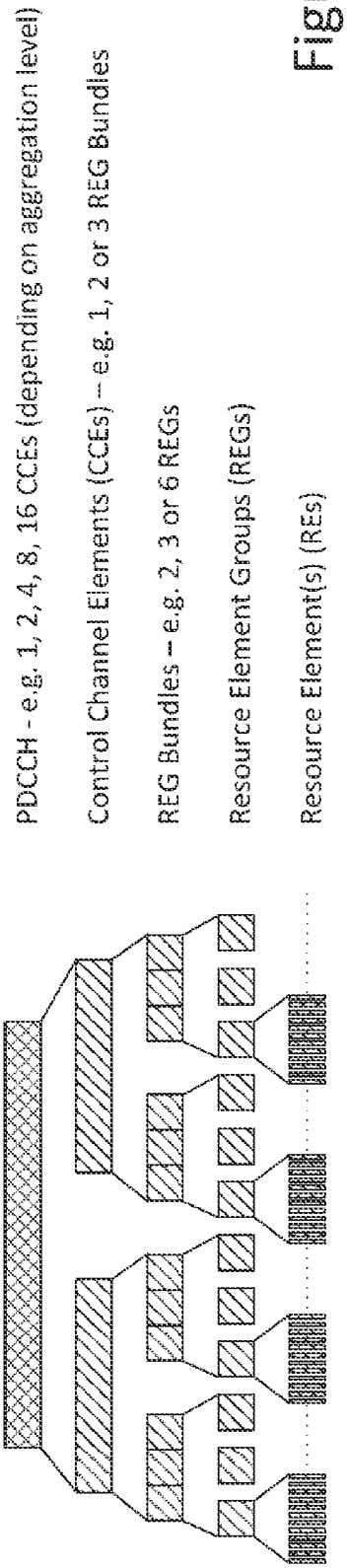
FIG. 3B is a simplified illustration of the relationship between a PDCCH candidate and the various different groupings of resources in the telecommunication system of FIG. 1.

Referring to FIG. 3, FIG. 3A is a simplified illustration of a slot comprising a plurality of CORESETS in the telecommunication system of FIG. 1, and FIG. 3B is a simplified illustration of the relationship between a PDCCH candidate and the various different groupings of resources in the telecommunication system of FIG. 1.

As seen in FIG. 3A, the base station 5 of the telecommunication system 1, can configure a UE 3, such as the REDCAP UE 3-1, with one or more CORESETs 310 comprising a set of time-frequency resources with which the UE 3 can search for downlink control information (DCI) transmitted by the base station 5 on a PDCCH. Each CORESET may be up to 3 OFDM symbols in length. The CORESET configured for a UE 3 will typically include one or more UE specific CORESETs configured, for example, by RRC signalling, and one or more common CORESETs configured by system information, for example, by a master information block (MIB). For example, the base station 5 is configured to use the MIB to configure an initial CORESET (CORESET 0) in which to search for a PDCCH providing scheduling for the physical downlink shared channel (PDSCH) providing system information block type 1 (SIB1).

The base station 5 may therefore transmit downlink control information (DCI) for a specific UE 3 in a PDCCH that uses the resources of a UE specific CORESET defined for that UE 3.

[Math. 2]

As seen in FIG. 3B, a PDCCH is made up of a number of (typically 1, 2, 4, 8, 16) control channel elements (CCEs) depending on the required aggregation level (L∈{2, 4, 8, 16}). Each CCE is made up of a number of (typically 1, 2 or 3) resource element group bundles (REG bundles) each comprising a number of resource element groups (REGs) made up of resource elements (REs). Each RE is effectively the smallest unit of the resource grid is made up of one subcarrier in the frequency domain and one OFDM symbol in time domain. A REG corresponds to one resource block (i.e., 12 REs/subcarriers) in the frequency domain and one OFDM symbol time domain.

A number of search spaces may be configured dynamically by the base station 5, or may be predefined, in which a UE 3 may search for DCI. Each search space comprises a set of candidate PDCCHs formed by CCEs of a CORESET at a given aggregation level, which the UE 3 can attempt to decode. The search spaces may include one or more UE specific search spaces (USSs) configured for a single UE (e.g., using RRC signalling from the base station to the UE) and/or one or more common search spaces (CSSs) that are predefined and hence known to all UEs 3 in advance.

For example, the following five PDCCH search space sets are typically configured to support of the basic communication functionalities:

A common search space set for system information block type 1 (SIB1), A common search space set for other system information, A common search space set for RACH, A common search space set for paging, and A UE-specific search space set for data transmission and reception.

The parameters configuring each CORESET define the time/frequency resources of that CORESET in which to search for downlink control information. Each CORESET may be identified by a CORESET identifier/index (e.g., using a ControlResourceSetID IE or the like). The parameters configuring each search space define how/where to search for PDCCH candidates in a CORESET with which that search space is associated. Each search space may be identified by a search space identifier/index (e.g., using a SearchSpaceID or the like). Each search space may be associated with one or more additional search spaces that form part of a group of search spaces or a 'search space set' by means of by means of a common group identifier or index (e.g., a searchSpaceGroupId or the like).

The UEs 3 are configured to perform channel estimation needs based on demodulation reference signals (DMRS) transmitted by the base station in the CCEs forming a PDCCH candidate before any attempt is made to decode any control DCI provided in that PDCCH candidate.

A number of different DCI formats can be used by the base station 5, depending on requirements, for transmission on a PDCCH corresponding to one of the PDCCH candidates in one of the search spaces configured for a given UE 3. For example, the base station 5 may be able to transmit DCI using one or more of the currently standardised DCI formats as set out in Table 2:
[Table 2]

TABLE 2

DCI Format Summary

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of 3GPP TS 38.473. |
| 2_6 | Notifying the power saving information outside DRX Active Time for one or more UEs |
| 3_0 | Scheduling of NR sidelink in one cell |
| 3_1 | Scheduling of LTE sidelink in one cell |

The REDCAP UEs reduced capability may mean that it does not monitor for all of these DCI formats. For example, the REDCAP UE 3-1 would typically not have the capability to monitor DCI format 2_0 (Slot Format Indicators) on a licensed band for search space set group switching.

Figure 4A:
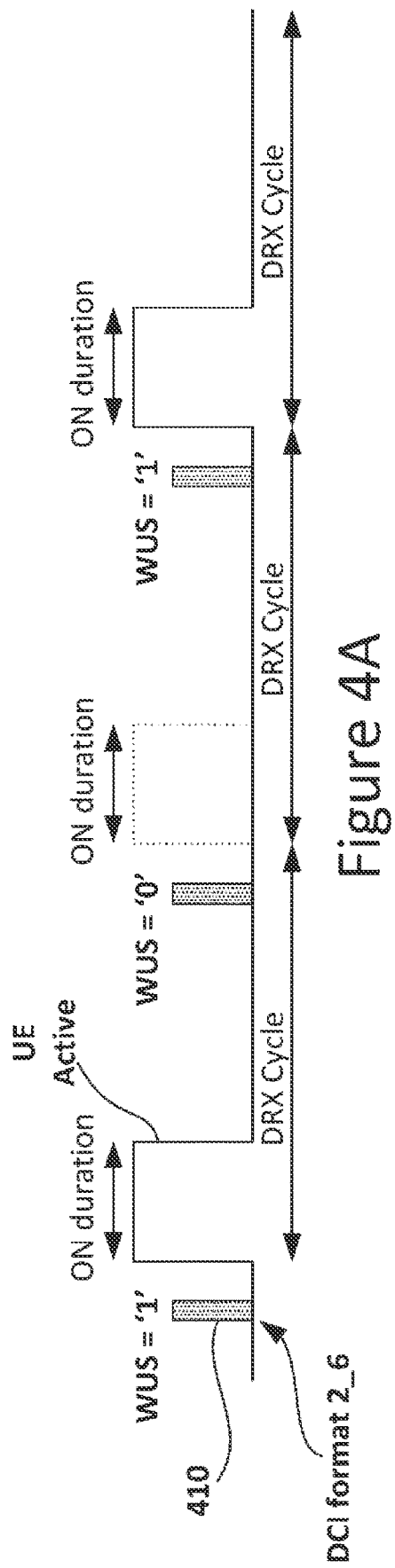
FIG. 4A is a simplified illustration of a discontinuous reception (DRX) mechanism.

Referring to FIG. 4, FIG. 4A is a simplified illustration of a discontinuous reception (DRX) mechanism, and FIG. 4B is a simplified illustration of the contents of a DCI format for notifying the power saving information outside of a DRX active time for one or more UEs.

Each UE 3 is configured to be able to implement a number of power saving functions including the ability to operate in a DRX mode, similar to that illustrated in FIG. 4A in which the UE 3 is configured to switch off radio frequency circuitry and front-end hardware during a DRX inactive, sleep, or 'OFF' period, of a DRX cycle, and to switch the circuitry and hardware on during an active or 'ON' period of the DRX cycle in order to monitor for and receive control information, such as scheduling information, on a PDCCH.

However, in the case of sporadic traffic, it can be inefficient for a UE 3 to periodically wake up to monitor PDCCH candidates every DRX ON period before returning to an inactive state during the OFF period. Accordingly, each UE 3 including the REDCAP UES 3-1, is configured to continue monitoring for a special DCI format (DCI format 2_6) during the OFF period. The DCI format includes a wake-up signal (WUS) field 410 that is used to inform a given UE 3 whether or not to wake up at the start of the ON period of the next DRX cycle, for potential data scheduling.

As seen in FIG. 4A, in the current version of DCI format 2_6 the WUS field 410 comprises a single bit that is set to '1' to indicate to a UE 3 that it should wake up and a '0' to indicate to the UE 3 that it should not wake up.

As seen in FIG. 4B, DCI format 2_6 also includes a secondary cell (SCell) dormancy indication to indicate whether or not one or more SCells should remain dormant after the UE wakes up. To reduce the blocking rate and resource overhead, DCI format 2_6 can be used to convey multiple WUS 410-1 to 410-$n$ and SCell dormancy indications 412-1 to 412-$n$ for one or more UEs in a group, where each UE in the group is configured with the location of the wake-up indication.

Beneficially, the telecommunication network 1 implements a number of advantageous procedures and features. These procedures and features are particularly beneficial in the context of REDCAP UEs but may be extended to other types of UEs to provide additional PDCCH monitoring flexibility, reliability and/or efficiency. It will be appreciated that these procedures and features are neither dependent on one another, nor mutually exclusive, and so could be implemented individually in isolation from one another or in combination.

Dynamic CORESET/search space ON/OFF For example, the telecommunication network 1 beneficially implements a number of procedures for allowing CORESETs and/or search spaces to be switched on, or off, dynamically, for a given UE 3.

In a particularly advantageous procedure, the base station 5 is able to configure the UE 3 to reconfigure the CORESETs and/or search spaces as soon as the UE 3 wakes up from the inactive or OFF part of the DRX cycle. Specifically, in the telecommunication system 1, DCI format 2_6 is modified to notify each UE 3, outside of the DRX active time, of the CORESET(s) and/or search space set(s) that are to be monitored by the UE 3, when the UE 3 wakes up and becomes active during the DRX ON period.

Advantageously, the WUS field of DCI format 2_6 is modified to provide an indication of each CORESET and/or PDCCH search space set that is to be monitored by the UE 3.

The base station 5 is therefore able to dynamically configure the UEs 3, and in particular the REDCAP UE 3-1, to update the CORESET(s) and/or search space set(s) that are to be monitored following a period of sleep, for example when some of the originally configured CCEs are being occupied by other, active, UEs 3 and the risk of blocking is therefore high. Thus, dynamic search space 'ON/OFF' is supported by the UEs 3, including the REDCAP UE 3-1, and can be applied, in conjunction with the DRX operation mode, to ensure that the UE 3 begins to monitor the correct search spaces/CORESET as soon as the UE wakes up.

This approach thus allows for a reduction in the number of simultaneously monitored search space sets and allows an active search space set to be dynamically reconfigured at the same time as the UE wakes up, with no increase to PDCCH monitoring. It can be seen, therefore, that the CORESET/search space can beneficially be configured based on data traffic and thereby reduce the number of blind decoding attempts and the blocking probability while maintaining scheduling flexibility.

It will be appreciated that, when the UE 3 is in the active state, if some of the configured search space sets are being blocked by other (higher priority) UEs, it may also be beneficial for the UEs 3, and in particular the REDCAP UE 3-1, to be able to update the search space sets monitored.

Accordingly, in another particularly advantageous procedure, the base station 5 is able to configure the UE 3 to reconfigure the CORESETs and/or search spaces while the UE 3 is active, for example during the ON period of the DRX cycle. Specifically, the telecommunication system 1 also implements a modified DCI format 1_1 and/or 0_1 that can be used by the base station 5 to reconfigure the CORESET and/or the associated PDCCH search space sets monitored by the UEs 3, and in particular the REDCAP UE 3-1, during the active time. Beneficially, in this example, to avoid an increase in the DCI size, one or more existing fields of the DCI format is repurposed for providing an indication an indication of each CORESET and/or PDCCH search space set that is to be monitored by the UE 3. Beneficially, therefore there is no increase in PDCCH monitoring arising from the change. Specifically, in this example the Code Block Group (CBG) transmission information (CBGTI) fields are reused although it will be appreciated that a different field could, alternatively, be repurposed. It will, nevertheless, be appreciated that a different existing field may be repurposed to provide the indication, or an additional dedicated field could be added instead of a repurposed field.

It will be appreciated that the modification of DCI format 1_1/0_1 may be used instead of, or in conjunction with, the modification of DCI format 2_6. The field used in DCI format 1_1, 0_1 or 2_6 to reconfigure the CORESETs and/or search spaces may, for example, be in the form of a bitmap having a separate bit representing the ON/OFF configuration for each CORESET and/or search space set that the UE 3 that the UE 3 may be configured with (e.g., where '1' indicates 'ON'; '0' indicates 'OFF' or vice versa). For example, if a REDCAP UE 3-1 can support three search space sets, three bits may be introduced in DCI for dynamic indication for switching three active search space sets on or off, where '1' indicates 'ON'; '0' indicates 'OFF'.

After the RRC connection is established, the search space sets for SIB1 and other system information may, beneficially, be released to reduce the number of simultaneously monitored search space sets and hence the number of blind decoding attempts. Moreover, the search space sets for other functionalities could be configured in place of the released search space sets. For example, the PDCCH search space sets to be searched by the UE 3 could be reconfigured to control information relating to pre-emption, slot format indication (SFI), group transmit power control (TPC), power saving, and/or the like.

Beneficially, in the telecommunication system 1, the maximum number of simultaneously monitored search space sets by the UE 3 is configurable (for example to between 3 to 8 inclusive). It will be appreciated that the maximum number of simultaneously monitored search space sets may be configured using RRC signalling, or may be configured by UE power saving assistance information for the UE 3, from which the base station 5 can derive an appropriate value for the UE's specific configuration.

UE Assistance Information for Reduced PDCCH Monitoring

To support the various types of terminal and service, multiple reduced PDCCH monitoring capabilities may be configured in the telecommunications system 1 for REDCAP UEs 3-1. To support this the REDCAP UE 3-1 is beneficially configured to report its reduced PDCCH monitoring capability to the base station.

However, to mitigate the network complexities and inefficiencies that may arise from freely reporting different sets of UE capabilities in an unrestricted manner, a UE power saving preference table, or set of sub-tables, is configured that defines a plurality of different UE power saving configurations, each power saving configuration representing a different respective set of parameters. An indication of the power saving configuration of a particular UE 3 is, in this example, reported by that UE 3 to the base station 5 as part of UE assistance information. The base station 5 is configured to determine, from the received indication, a set of requirements for configuring the UE 3 appropriately based on the corresponding power saving configuration.

PDCCH Candidate Dropping

Each UE 3 is preconfigured with a maximum number of blind decode attempts, and a maximum number of CCEs used for channel estimation purposes within a given slot. When a UE 3 is searching for control information any unsearched PDCCH candidates will be skipped (or 'dropped') when either the number of blind decodes, or the number of CCEs, exceeds the maximum defined for the UE 3 in that slot.

This gives rise to the possibility that some search spaces, especially high index USSs will be searched only rarely, if at all. This is a particular issue for REDCAP UEs in which the maximum number of blind decode attempts, and maximum number of CCEs used for channel estimation purposes, may be reduced.

Accordingly, the telecommunication system 1 beneficially implements a modified set of rules for determining which search spaces should be monitored. Specifically, the telecommunication system can implement one or more of the following rule variations to provide an improved balance among search space sets and thus improve PDCCH detection performance.

In one rule variation, once every CSS has been searched, rather than always starting with the lowest index USS, the first USS searched by the UE changes from slot to slot. This can be achieved by assigning the highest priority to a different USS each slot. For example, the highest priority USS may be cycled from slot-to-slot starting from the USS having the lowest index in a first slot, before being reassigned to the USS having the next lowest index, in ascending order, in the next slot, and so on. The USSs are then searched, starting from the highest priority USS, in order of increasing USS index. When the highest index USS has been searched, if there are any unsearched lower index USSs (and the maximum blind decodes/CCEs has not been reached) the UE returns to the lowest index USS and the continues to search the unsearched USSs in order of increasing USS index from the lowest index USS. After the USS having the highest index has been assigned the highest priority the procedure can essentially restart, in the next slot, with the lowest index USS being assigned the highest priority.

In another rule variation, the maximum number of blind decode attempts is essentially shared between CSSs and USSs (e.g., based on a fractional value or the like configured at the UE 3). Once the share of blind decoding attempts has been reached for CSS searching the UE 3 begins to search the USSs until the maximum number of blind decode attempts or maximum number of CCEs is reached (or there are no more USSs to search). If all USSs have been searched and the maximum number of blind decode attempts has not been reached then any remaining CSS can be searched. It will be appreciated that prioritisation of the USS may be in increasing order of USS index, or based on cycling of the highest priority USS described above. Moreover, in addition to, or as an alternative to, sharing the maximum number of blind decode attempts the maximum number of CCEs could be shared between the USSs or CSSs.

In current systems, during the searching process, if the number of PDCCH candidates in a given search space (e.g., a USS) is larger than the number that can be searched without exceeding the maximum number of blind decode attempts (and/or maximum number of CCEs), then the whole search space set is dropped without any PDCCH candidate being searched of that search space set.

Beneficially, in another rule variation, the UE 3 is configured to continue to search PDCCH candidates of a search space set, until the maximum number of blind decode attempts (and/or maximum number of CCEs) is reached, even when the number of PDCCH candidates of that search space set is larger than the number that can be searched without exceeding the maximum number of blind decode attempts (and/or maximum number of CCEs).

Discontinuous PDCCH Monitoring

In order to know when to search for control information the UEs 3 are configured to determine a PDDCH monitoring occasion, typically comprising a plurality of slots, within which it should search for the control information. Beneficially, in the telecommunication system 1, the UEs 3 are configurable to be able to monitor for the PDCCH either continuously in every consecutive slot or discontinuously every other slot or every few slots.

This is particularly beneficial for supporting a higher number of UE connections, taking account the short symbol durations that may be used for PDCCH monitoring in higher numerologies (e.g., for supporting the higher frequency bands of frequency range FR2).

User Equipment

Figure 5:
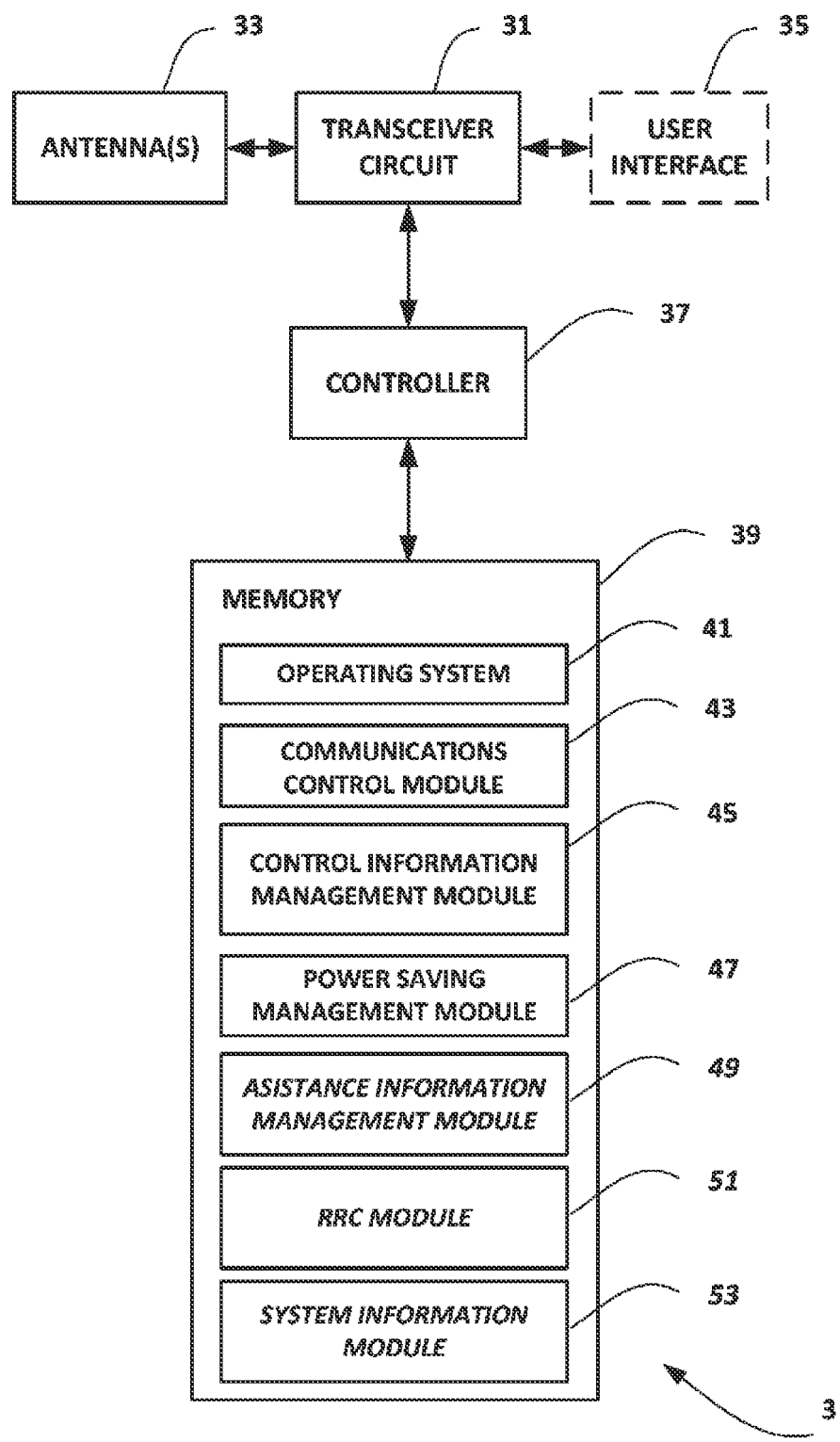
FIG. 5 is a schematic block diagram illustrating the main components of a user equipment for the telecommunication system shown in FIG. 1.

FIG. 5 is a schematic block diagram illustrating the main components of a UE 3 as shown in FIG. 1, and in particular the REDCAP UE 3-1 (e.g., an industrial wireless sensor, surveillance video equipment, wearable device, or other user equipment). It will be appreciated that while the UE 3 is described as being a REDCAP UE, the UE 3 may be configured for operating as another, non-REDCAP, UE 3.

As shown, the UE 3 has a transceiver circuit 31 that is operable to transmit signals to and to receive signals from a base station 5 via one or more antenna 33. The UE 3 has a controller 37 to control the operation of the UE 3. The controller 37 is associated with a memory 39 and is coupled to the transceiver circuit 31. Although not necessarily required for its operation, the UE 3 might, of course, have all the usual functionality of a conventional UE 3 (e.g., a user interface 35, such as a touch screen/keypad/microphone/speaker and/or the like for, allowing direct control by and interaction with a user) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41, a communications control module 43, a control information management module 45, a power saving management module 47, an assistance information management module 49, an RRC module 51, and a system information module 53.

The communications control module 43 is operable to control the communication between the UE 3 and its serving base station(s) 5 (and other communication devices connected to the base station 5, such as further UEs and/or core network nodes). The communications control module 43 is configured for the overall handling uplink communications via associated uplink channels (e.g., via a physical uplink control channel (PUCCH) and/or a physical uplink shared channel (PUSCH)) and for handling receipt of downlink communications via associated downlink channels (e.g., via a physical downlink control channel (PDCCH) and/or a physical downlink shared channel (PDSCH)). The communications control module 43 is responsible for determining the resources to be used by the UE 3 and to determine which bandwidth part (or sub-band) is allocated for the UE 3 (e.g., based on a bandwidth supported by the transceiver circuit 31).

The control information management module 45 is responsible for managing the tasks related to the reception of downlink control information from the base station. These tasks include, but are not limited to: identifying monitoring occasions within which to search for control information; configuring and reconfiguring the CORESETs and the search spaces within which to search PDCCH candidates; monitoring for downlink control information in CSSs and/or USSs a including performing channel estimation and conducting the related searches; decoding downlink control information transmitted to the UE 3 by the base station using an appropriate DCI format.

The power saving management module 47 is responsible for managing power saving tasks at the UE 3, for example: operation in a DRX mode; switching the appropriate parts of the transceiver circuit 31 ON or OFF at appropriate time in a DRX cycle for example by responding to a WUS provided by the base station 5, using DCI format 2_6, and received and decoded by the control information management module 45. The power saving management module 47 maintains the UE power saving preference table.

The assistance information management module 49 manages the generation of UE assistance information for assisting the base station 5 to configure communication with the UE appropriately, and the sending of that UE assistance information to the base station 5 when required. The assistance information may include any appropriate information relating to the UE's capabilities and/or configuration, for example an indication of the UEs power saving configuration.

The RRC module 51 is responsible for the reception of RRC signalling from the base station 5, and the transmission of RRC signalling to the base station 5.

The system information module 53 is responsible for the reception of system information from the base station 5.

Base Station

Figure 6:
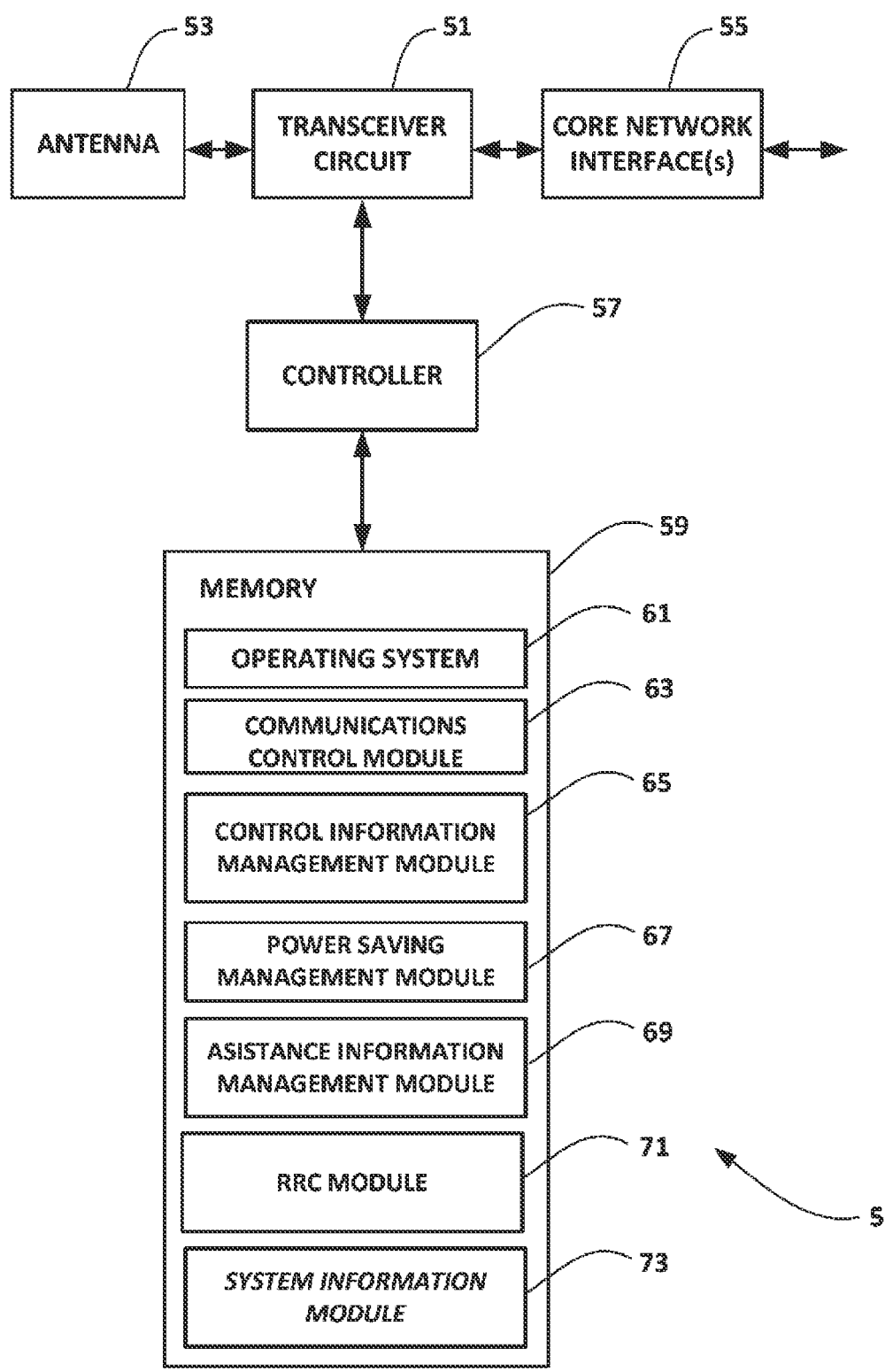
FIG. 6 is a schematic block diagram illustrating the main components of a base station for the telecommunication system shown in FIG. 1.

FIG. 6 is a schematic block diagram illustrating the main components of the base station 5 for the telecommunication system 1 shown in FIG. 1. As shown, the base station 5 has a transceiver circuit 51 for transmitting signals to and for receiving signals from the communication devices (such as UEs 3) via one or more antenna 53 (e.g., an antenna array/massive antenna), and a core network interface 55 (e.g., comprising the N2, N3 and other reference points/ interfaces) for transmitting signals to and for receiving signals from network nodes in the core network 7. Although not shown, the base station 5 may also be coupled to other base stations via an appropriate interface (e.g., the so-called 'Xn' interface in NR). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59.

As shown, these software instructions include, among other things, an operating system 61, a communications control module 63, a control information management module 65, a power saving management module 67, an assistance information management module 69, an RRC module 71, and a system information module 73.

The communications control module 63 is operable to control the communication between the base station 5 and UEs 3 and other network entities that are connected to the base station 5. The communications control module 63 is configured for the overall control of the reception of uplink communications, via associated uplink channels (e.g., via a physical uplink control channel (PUCCH) and/or a physical uplink shared channel (PUSCH)) and for handling the transmission of downlink communications via associated downlink channels (e.g., via a physical downlink control channel (PDCCH) and/or a physical downlink shared channel (PDSCH)).

The control information management module 65 is responsible for managing the tasks related to the transmission of downlink control information from the base station. These tasks include, but are not limited to: generating parameters for use by a UE 3 in identifying monitoring occasions within which to search for control information and transmitting those parameters to the UE 3; generating configuration information for configuring (and reconfiguring) the CORESETs and search spaces within which to search PDCCH candidates; generating downlink control information for reception by a particular UE 3, or group of UEs 3, and the transmission of that downlink control information using a PDCCH in a corresponding PDCCH candidate of a search space using an appropriate DCI format.

The power saving management module 67 is responsible for managing power saving for the UE 3 from the base station side. This may include, for example, triggering of UE 3 to wake-up from an inactive state by using a WUS provided to the UE 3, using DCI format 2_6. The power saving management module 67 may also be responsible for triggering the sending of configuration information for configuring the power saving preference table at the UE 3 (if the table is configured by the base station 5).

The assistance information management module 69 manages the reception and interpretation of UE assistance information for assisting the base station 5 to configure communication with the UE appropriately from the UE 3. The assistance information may include any appropriate information relating to the UE's capabilities and/or configuration, for example an indication of the UEs power saving configuration.

The RRC module 71 is responsible for the reception of RRC signalling from UE 3, and the transmission of RRC signalling to the UE 3.

The system information module 73 is responsible for the transmission of system information to UEs in the base station's cell(s) 9.

Dynamic CORESET/search space ON/OFF The different possible mechanisms for providing dynamic reconfiguration of the CORESET(s)/search space(s) will now be described in more detail, by way of example only, with reference to FIGS. 7 and 8.

DCI Format 2_6

FIG. 7A is a simplified illustration of a DRX cycle in which a wake-up signal is used to indicate whether or not a given UE 3 should become active during an ON period of the DRX cycle. As seen in FIG. 7A, the WUS field 410 of DCI format 26 is set to provide a CORESET ON/OFF indication and/or a search space ON/OFF indication before the UE 3 wakes up.

In this example, the WUS field 410 is provided in the form of a bitmap having a separate bit representing the ON/OFF configuration for each CORESET and/or each search space set that the UE 3 that the UE 3 may be configured with (e.g., where '1' indicates 'ON'; '0' indicates 'OFF' or vice versa). The mapping of each bit of the WUS field to a specific CORESET (and hence the associated search space(s) configured for that CORESET) may be based on the CORESET identifier/index (e.g., the controlResourceSetId IE) with each bit representing a different configured CORESET in ascending (or descending) order of CORESET identifier.

The mapping of each bit of the WUS field to a specific search space set (or group of search space sets) may be based on the search space (e.g., using a SearchSpaceID or the like), or a common search space group identifier/index (e.g., a searchSpaceGroupId or the like), with each bit representing a different configured search space set, or group of search space sets, in ascending (or descending) order of the identifier/index.

It will be appreciated that that the WUS field may be set to all zeros to indicate that the UE 3 should not wake up for the next DRX cycle.

Figure 8A:
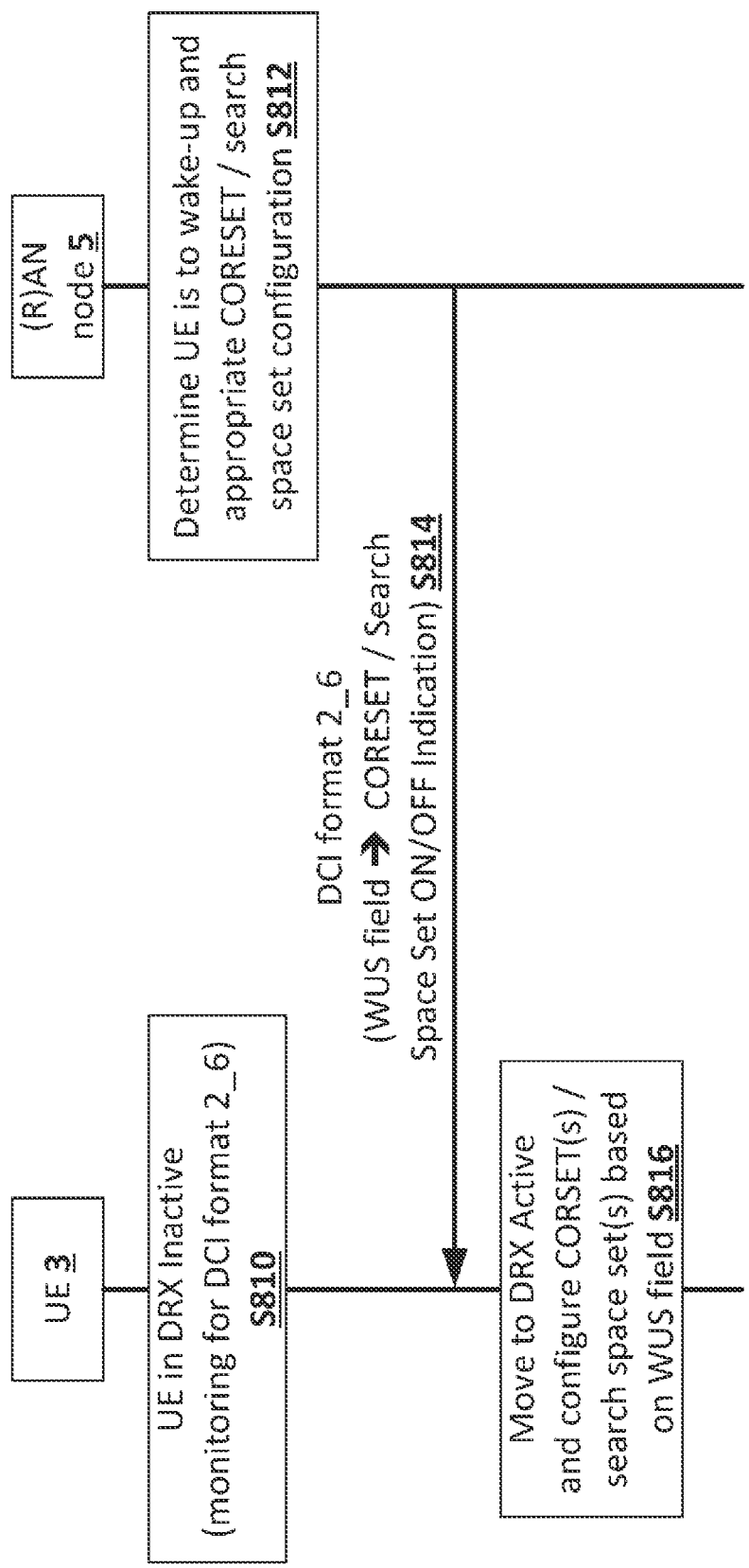
FIG. 8A is a simplified timing diagram illustrating a procedure, which may be implemented in the telecommunication system of FIG. 1.

FIG. 8A is a simplified timing diagram illustrating a procedure, which may be implemented in the telecommunication system 1 of FIG. 1 and in which the WUS field of DCI format 2_6 is used to provide a CORESET ON/OFF indication and/or a search space ON/OFF indication before the UE 3 wakes up.

As seen in FIG. 8A when the UE 3 operating in a DRX mode and is in a DRX inactive state during the DRX OFF period it does, nevertheless, monitor for control information in DCI format 2_6 at S810. When the base station 5 determines, at S812 that the UE 3 is to wake up, it determines an appropriate CORESET and/or search space set configuration. The base station 5 then sends, at S814, downlink control information, using DCI Format 2_6, with the WUS field set to provide the corresponding CORESET ON/OFF indication and/or a search space ON/OFF indication representing the new configuration.

The UE 3 moves to an active state at the start of the next DRX ON period and configures its CORESET(s) and/or search space set(s) appropriately based on the content of the WUS field at S816.

Figure 7B:
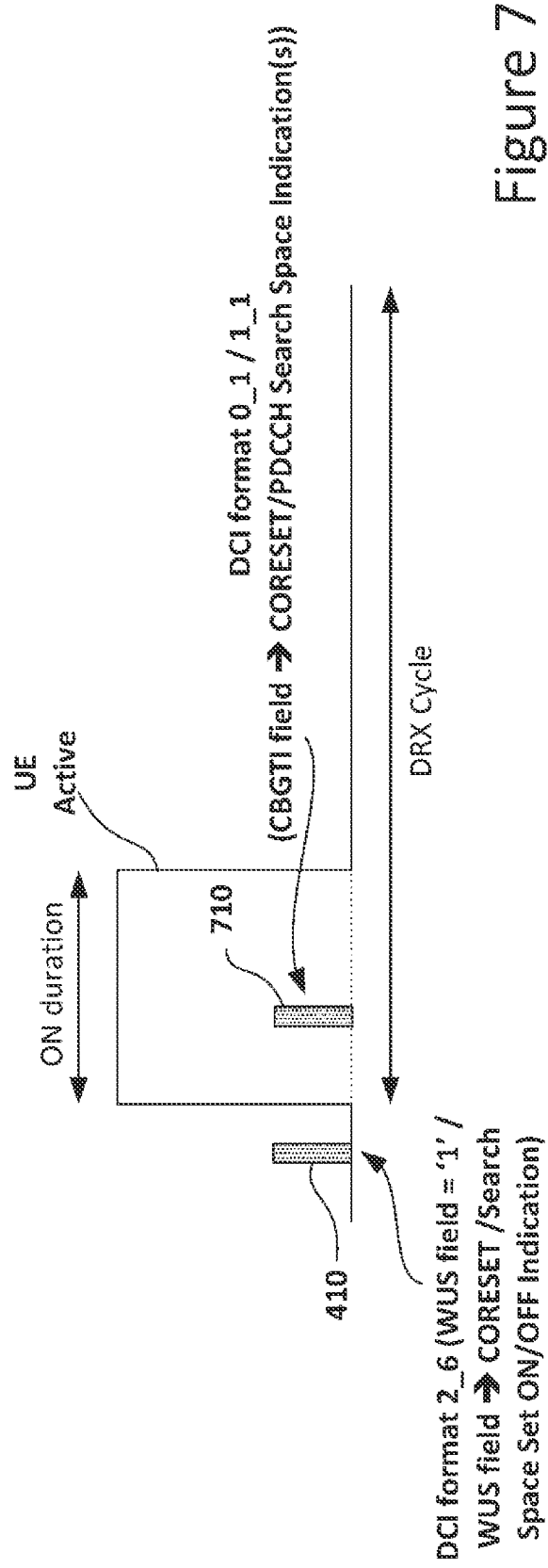
FIG. 7B is another simplified illustration of another DRX cycle in which a wake-up signal is used to indicate whether or a UE should become active.

DCI Format 0_1/1_1 FIG. 7B is a simplified illustration of a DRX cycle in which a wake-up signal is used to indicate whether or not a given UE 3 should become active during the next ON period of the DRX cycle. In FIG. 7B the WUS signal may form part of a conventional DCI 2_6 in which the WUS field 410 is a single bit or a WUS field as described with reference to FIG. 7A in which the WUS field 410 provides a CORESET ON/OFF indication and/or a search space ON/OFF indication before the UE 3 wakes up.

As seen in FIG. 7B, when the UE 3 is active during the ON period of the DRX cycle DCI 710 is provided by the base station 5 using DCI format 0_1 (as summarised in Table 3) and/or DCI 1_1 (as summarised in Table 4). This DCI 710 is configured to provide a CORESET ON/OFF indication and/or a search space ON/OFF indication when reconfiguration of the CORESET(s) and/or a search space set(s) is required.

[Table 3]

TABLE 3

| DCI Format 0_1 | |
| --- | --- |
| Field | Bits |
| Identifier for Downlink Control Information (DCI) formats | 1 |
| Carrier indicator | 0 or 3 |
| Downlink Feedback Information (DFI) Flag | 0, 1 |
| Hybrid Automatic Repeat Request-Acknowledgement (HARQ-ACK) bitmap | 0, 16 |
| Uplink/Supplementary Uplink (UL/SUL) Indicator | 0, 1 |
| Bandwidth part indicator | 0, 1, 2 |
| Frequency domain resource assignment | Variable |
| Time domain resource assignment | 0, 1, 2, 3, 4, 5, or 6 |
| Frequency Hopping Flag | 0, 1 |
| Modulation and coding scheme | 5 |
| New data indicator | 1 |
| Redundancy version | 2 |
| Hybrid Automatic Repeat Request (HARQ) process number | 4 |
| 1st Downlink assignment index | 1, 2, or 4 |
| 2nd Downlink assignment index | 0, 2, or 4 |
| TPC command for scheduled Physical Uplink Shared Channel (PUSCH) | 2 |
| Sounding Reference Signal (SRS) resource indicator | Variable |
| Precoding information and number of layers (transmitted precoding matrix indicator (TPMI)) | 0, 1, 2, 3, 4, 5, 6 |
| Antenna ports | 2, 3, 4, 5 |
| SRS request | 2 |
| Channel State Information (CSI) request | 0, 1, 2, 3, 4, 5, 6 |
| Code Block Group (CBG) transmission information (CBGTI) | 0, 2, 4, 6, 8 |
| Phase Tracking Reference Signal (PTRS) - Demodulation Reference Signal (DMRS) Association | 0, 2 |
| beta_offsetr Indicator | 0, 2 |
| DMRS Sequence Initialization | 0, 1 |
| Uplink Shared Channel (UL-SCH) Indicator | 1 |
| ChannelAccess-CPext-CAPC | 0, 1, 2, 3, 4, 5 or 6 |
| Open-loop power control parameter set indication | 0 or 1 or 2 bits |
| Priority indicator | 0, 1 |
| Invalid symbol pattern indicator | 0, 1 |
| Minimum applicable scheduling offset indicator | 0, 1 |
| Secondary Cell (SCell) dormancy indication | 0, 1, 2, 3, 4, 5 |
| Sidelink assignment index | 0, 1, 2 |

[Table 4]

TABLE 4

| DCI Format 1_1 | |
| --- | --- |
| Field | Bits |
| Identifier for Downlink Control Information (DCI) formats | 1 |
| Carrier indicator | 0, 3 |
| Bandwidth part indicator | 0, 1, 2 |
| Frequency domain resource assignment | Variable |
| Time domain resource assignment | 0, 1, 2, 3, 4 |
| Virtual Resource Block to Physical Resource Block (VRB-to-PRB) mapping | 0, 1 |
| Physical Resource Block (PRB) bundling size indicator | 0, 1 |
| Rate matching indicator | 0, 1, 2 |
| ZP CSI-RS Trigger | 0, 1, 2 |

TABLE 4-continued

| DCI Format 1_1 | |
| --- | --- |
| Field | Bits |
| Modulation and coding scheme [Transport Block 1 (TB1)] | 5 |
| New data indicator [TB1] | 1 |
| Redundancy version [TB1] | 2 |
| Modulation and coding scheme [Transport Block 2 (TB2)] | 5 |
| New data indicator [TB2] | 1 |
| Redundancy version [TB2] | 2 |
| Hybrid Automatic Repeat Request (HARQ) process number | 4 |
| Downlink assignment index | 0, 2, 4, 6 |
| TPC command for scheduled Physical Uplink Shared Channel (PUCCH) | 2 |
| PUCCH resource indicator | 3 |
| Physical Uplink Shared Channel to Hybrid Automatic Repeat Request feedback (PDSCH-to-HARQ_feedback) timing indicator | 0, 1, 2, 3 |
| One-shot HARQ-ACK request | 0, 1 |
| PDSCH group index | 0, 1 |
| New feedback indicator | 0, 1, 2 |
| Number of requested PDSCH group(s) | 0, 1 |
| Antenna port(s) and number of layers | 4, 5, 6 |
| Transmission configuration indication | 0, 3 |
| Sounding Reference Signal (SRS) request | 2 |
| Code Block Group (CBG) transmission information (CBGTI) | 0, 2, 4, 6, 8 |
| CBG flushing out information (CBGFI) | 0, 1 |
| Demodulation Reference Signal (DMRS) sequence initialization | 1 |
| DMRS Sequence Initialization | 0, 1 |
| Priority indicator | 0, 1 |
| ChannelAccess-CPext-CAPC | 0, 1, 2, 3, 4 |
| Minimum applicable scheduling offset indicator | 0, 1 |
| Secondary Cell (SCell) dormancy indication | 0, 1, 2, 3, 4, 5 |

In this example, a field (e.g., CBGTI field or other appropriate field) of the DCI 710 may be in the form of a bitmap having a separate bit representing the ON/OFF configuration for each CORESET and/or each search space set that the UE 3 that the UE 3 may be configured with (e.g., where '1' indicates 'ON'; '0' indicates 'OFF' or vice versa). The mapping of each bit of the DCI field to a specific CORESET (and hence the associated search space(s) configured for that CORESET) may be based on the CORESET identifier/index (e.g., the controlResourceSetId IE) with each bit representing a different configured CORESET in ascending (or descending) order of CORESET identifier.

The mapping of each bit of the field of the DCI 710 to a specific search space set (or group of search space sets) may be based on the search space (e.g., using a SearchSpaceID or the like), or a common search space group identifier/index (e.g., a searchSpaceGroupId or the like), with each bit representing a different configured search space set, or group of search space sets, in ascending (or descending) order of the identifier/index.

Figure 8B:
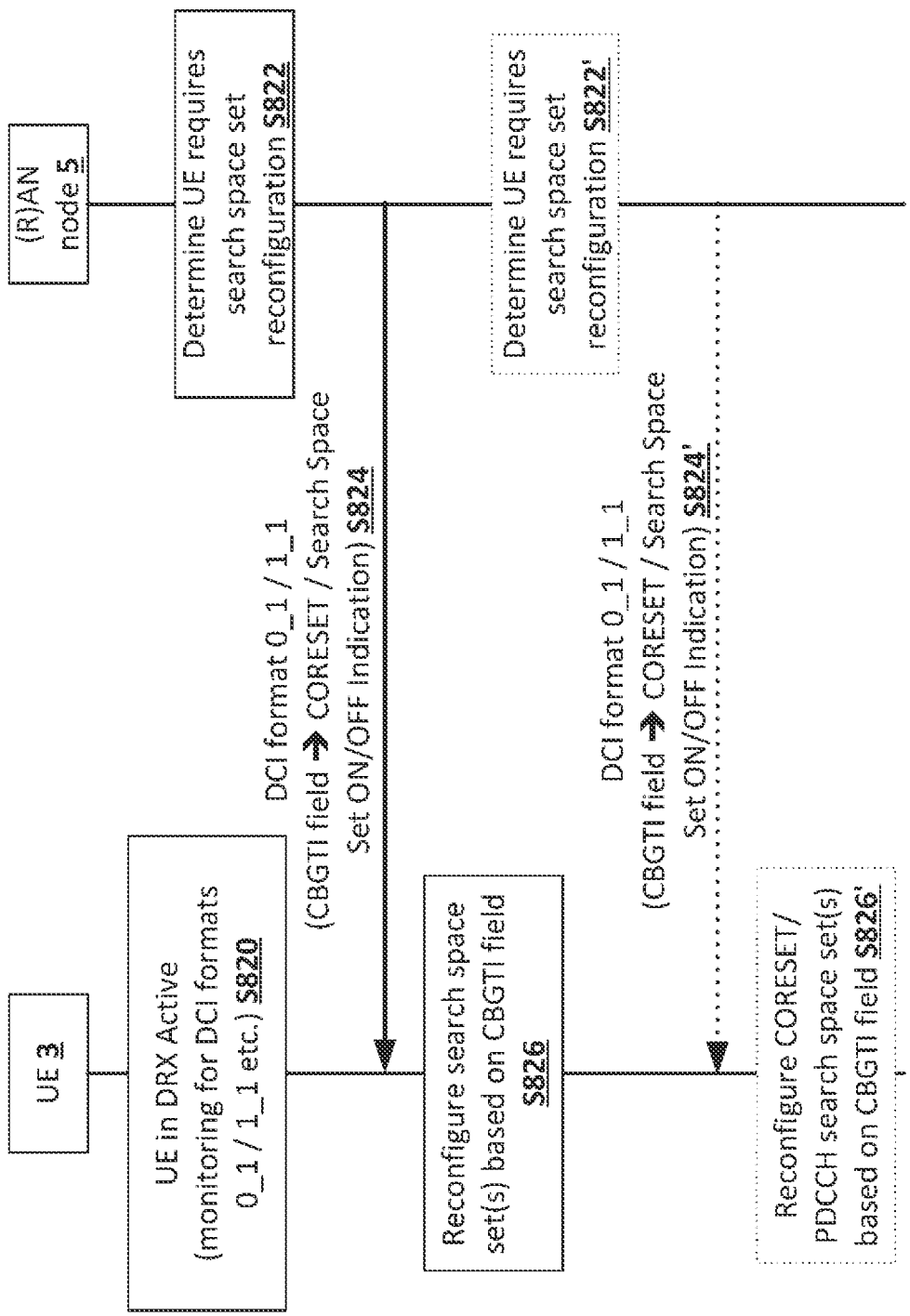
FIG. 8B is a simplified timing diagram illustrating another procedure, which may be implemented in the telecommunication system of FIG. 1.

FIG. 8B is a simplified timing diagram illustrating a procedure, which may be implemented in the telecommunication system 1 of FIG. 1, and in which a field of DCI format 0_1 and/or DCI format 1_1 is used to provide a CORESET ON/OFF indication and/or a search space ON/OFF indication when the UE 3 is active (e.g., in a DRX ON period of a DRX cycle).

As seen in FIG. 8B when the UE 3 operating in a DRX mode and is in an active state during the DRX ON period it monitors for control information in DCI format 0_1 and/or 1_1 at S820. When the base station 5 determines, at S822, that the UE 3 requires a CORESET and/or search space set reconfiguration, the base station 5 sends, at S824, downlink control information using DCI Format 0_1 and/or 1_1 with a field (e.g., CBGTI field or other appropriate field) set to provide the corresponding CORESET ON/OFF indication and/or a search space ON/OFF indication representing the new configuration.

The UE 3 reconfigures, at S826, its CORESET(s) and/or search space set(s) appropriately based on the content of the received DCI field.

The UE 3 may have its CORESET(s) and/or search space set(s) more than once while it is active by repeating the reconfiguration procedure as indicated in steps S822' to S824'.

UE Assistance Information for reduced PDCCH monitoring A possible mechanism for using UE Assistance Information to facilitate reduced PDCCH monitoring will now be described in more detail, by way of example only, with reference to FIG. 9.

Figure 9:
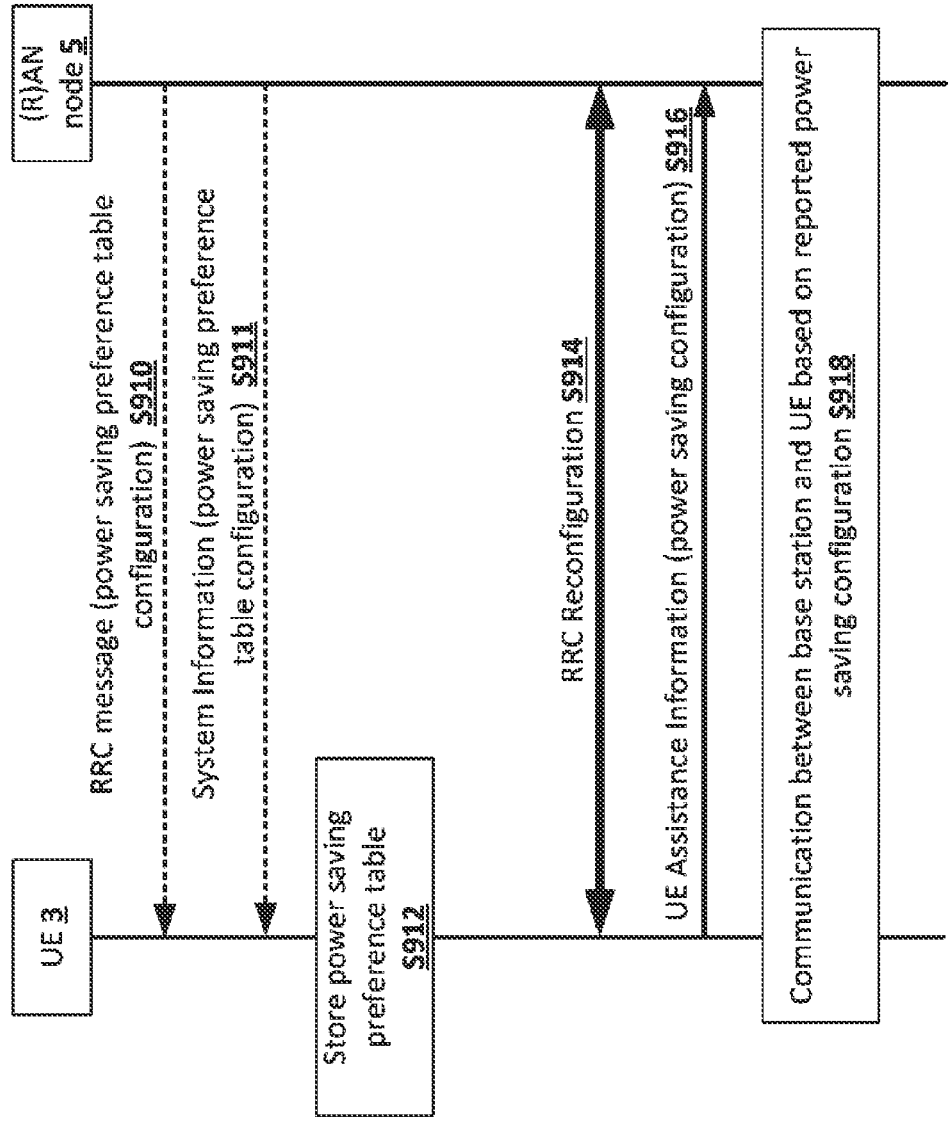
FIG. 9 is a simplified timing diagram illustrating another procedure, which may be implemented in the telecommunication system of FIG. 1.

FIG. 9 is a simplified timing diagram illustrating a procedure, which may be implemented in the telecommunication system 1 of FIG. 1 for a UE 3 to report its reduced PDCCH monitoring capability to the base station.

As seen in FIG. 9, the UE stores a power saving preference table (or set of sub-tables) at S912 that includes a number of discrete power saving configurations, this power saving table (or set of sub-tables) may be a preconfigured standardised table or may be configurable by the base station 5 using RRC signalling (as illustrated at S910) or system information (as illustrated at S911).

The UE power saving preference table defines a plurality of different UE power saving configurations, each power saving configuration representing different respective power saving assistance information comprising a set of characteristic parameters.

The UE power saving assistance information may include any suitable parameters relating to a UE's (e.g., a REDCAP UE's) configuration, power saving capabilities and/or constraints. For example, the power saving information will typically include configurable PDCCH monitoring parameters and search space configuration parameters (for each SCS), such as maximum number of blind decoding attempts and/or maximum number of PDCCH candidates per aggregation level. Moreover, since some devices may not support the usage of small aggregation levels information on the supported aggregation levels may also form part of the information representing a particular power saving configuration in the UE power saving preference table.

Whilst in release In Release 16, there could be up to 10 configured search space sets, the maximum number of configured search space sets may be reduced for REDCAP UEs. Furthermore, as described above, not all of the configured search space sets need to be monitored simultaneously for such UEs. For example, a REDCAP UE may support five configured search space sets, but only be able to monitor three search space sets at any one time. In order to support the reporting of such information the UE power saving preference table may also include the maximum number of configurable search space sets and/or the maximum number of simultaneously monitored search space sets in power saving assistance information for each power saving configuration.

The UE power saving assistance information may also provide use case scenario related information, such as expected UE battery life, reference bit rate, peak bit rate, latency.

An example format for a pair of sub-tables that may form the power saving preference information (or part of it), is provided below in Table 5 and Table 6. It will be appreciated that the exemplary tables are purely illustrative.

[Table 5]

TABLE 5

| PDCCH monitoring and Search Space Config | Aggregation level (s) | Number of candidates/ CCEs | Max number of blind decoding attempts | Maximum number of configurable search space sets | Maximum number of simultaneously monitored search space sets | |
|---|---|---|---|---|---|---|
| 1 | | | | | | |
| 2 | | | | | | |
| 3 | | | | | | |
| ... | ... | ... | ... | ... | ... | ... |
| n | | | | | | |

Example Power Saving Assistance Information 1

[Table 6]

TABLE 6

| Use Case Asst Info Config | Reference bit rate | Peak bit rate | Latency | UE battery life (range) | | |
|---|---|---|---|---|---|---|
| 1 | | | | | | |
| 2 | | | | | | |
| 3 | | | | | | |
| ... | ... | ... | ... | ... | ... | ... |
| n | | | | | | |

Example Power Saving Assistance Information 2

At appropriate junctures, such as following an RRC reconfiguration procedure as seen S914 in FIG. 9, the UE 3 provides, at S916, UE assistance information to the base station 5 that includes one or more indexes or similar identifier representing the power configuration corresponding to its reduced capabilities/use case. The identifier may, for example, be in the form of a respective index corresponding to the row of each table or sub-table the forms the power saving configuration.

Based on this information, the base station 5 can efficiently determine the appropriate parameters and configurations to use for configuring communication with the UE 3 at S918. For example, the base station can determine suitable PDCCH monitoring parameters, and appropriate configuration of periodicity and multiplexing options.

PDCCH Candidate Dropping

The various search space prioritisation schemes for determining the order in which search spaces should be monitored and/or when PDCCH candidates should be dropped will now be described in more detail with reference to FIGS. 10 to 12.

USS Priority Cycling

Figure 10:
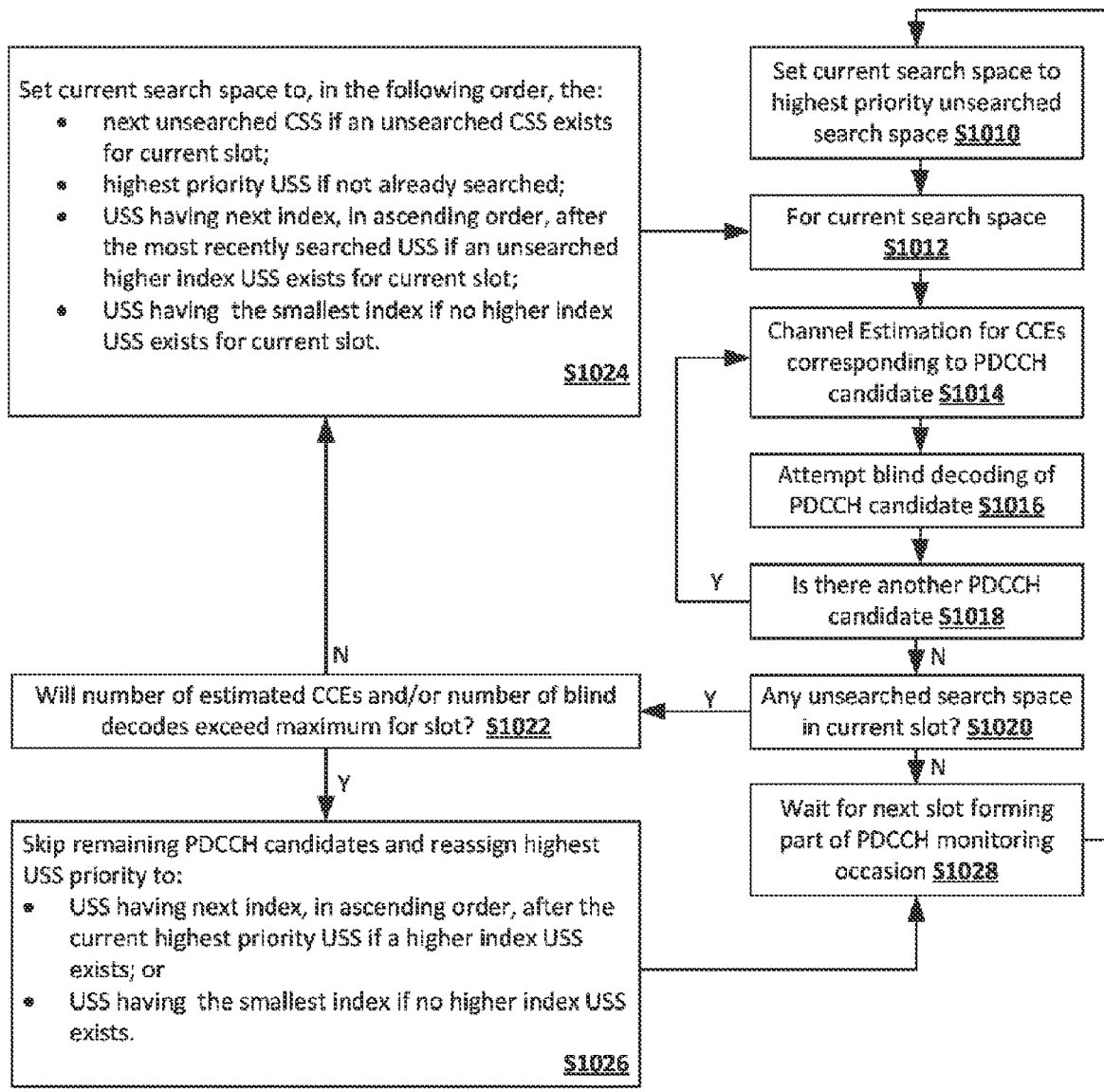
FIG. 10 is a simplified flow diagram illustrating a procedure which may be performed by a UE in the telecommunication system of FIG. 1.

FIG. 10 is a simplified flow diagram illustrating a procedure which may be performed by a UE 3, in the telecommunication system 1 of FIG. 1, for searching for control information in a plurality of search spaces using USS priority cycling based prioritisation scheme.

As seen in FIG. 10 at the start of a given PDCCH monitoring occasion in a particular slot, the search space to be searched is initially set to the highest priority unsearched search space at S1010. Typically, where there is a CSS to be searched, this will be the highest priority CSS. As indicated at S1012, the procedure continues with this highest priority unsearched search space as the current search space.

The UE 3 will proceed to perform channel estimation for the CCEs of each PDCCH candidate of the current search space at S1014, and then attempt to blind decode that PDCCH candidate at S1016, in turn as long as there is still another unsearched PDCCH candidate for the current search space at S1018.

When there is no longer an unsearched PDCCH candidate at S1018 the UE 3 determines whether there are any more unsearched search space sets for the current slot at S1020. If an unsearched search space still exists at S1020 then the UE 3 checks, at S1022 if searching that search space will result in the maximum number of channel estimated CCEs and/or maximum number of blind decodes being exceeded at S1022. If searching can continue without exceeding the maximum number of channel estimated CCEs and/or maximum number of blind decodes at S1022, then the UE 3 sets the current search space to be searched to the next highest priority search space at S1024, before repeating the procedure for the new current search space from S1012 to S1024 until either all the search spaces have been searched at S1020 or the searching cannot continue without exceeding the maximum number of channel estimated CCEs and/or maximum number of blind decodes at S1022.

In S1024 the priority of the search spaces is determined in accordance with the following order:
- An unsearched CSS is deemed to have the highest priority, if an unsearched CSS exists for current slot.
- The USS with the highest priority at the start of the search process will have the deemed next highest priority. As described in more detail below, this highest priority USS may be any one of the unsearched USSs and changes from slot-to-slot.
- The USSs are then prioritised in order of ascending index from the most recently searched USS until the highest index USS has been searched.
- The USSs are then prioritised in order of ascending index from the lowest index USS (assuming this was not the highest priority USS and so has not been searched already).

If the searching cannot continue without exceeding the maximum number of channel estimated CCEs and/or maximum number of blind decodes at S1022, then the remaining PDCCH candidates are skipped and the highest USS priority is reassigned at S1026. Specifically, the highest USS priority is reassigned cyclically, to the USS having the next index, in ascending order, after the current highest priority USS. If the current highest priority USS has the highest index USS then the highest USS priority is reassigned to the USS having the lowest index.

Once the highest USS priority has been reassigned at S1026, or when the search spaces have all been searched at S1020, the UE 3 waits at S1028 for the next slot of the current (or next) PDCCH monitoring occasion before repeating the procedure starting at S1010.

It will be appreciated that this represents just one example of how a USS priority cycling based prioritisation scheme may be used for determining the order in which search spaces should be monitored. It will also be appreciated that the reassignment of the highest priority USS at S1026 may also take place, when the search spaces have all been searched at S1020, before waiting at S1028 for the next slot of the current (or next) PDCCH monitoring occasion at S1010.

CSS/USS Shared PDDCH Candidates

Figure 11:
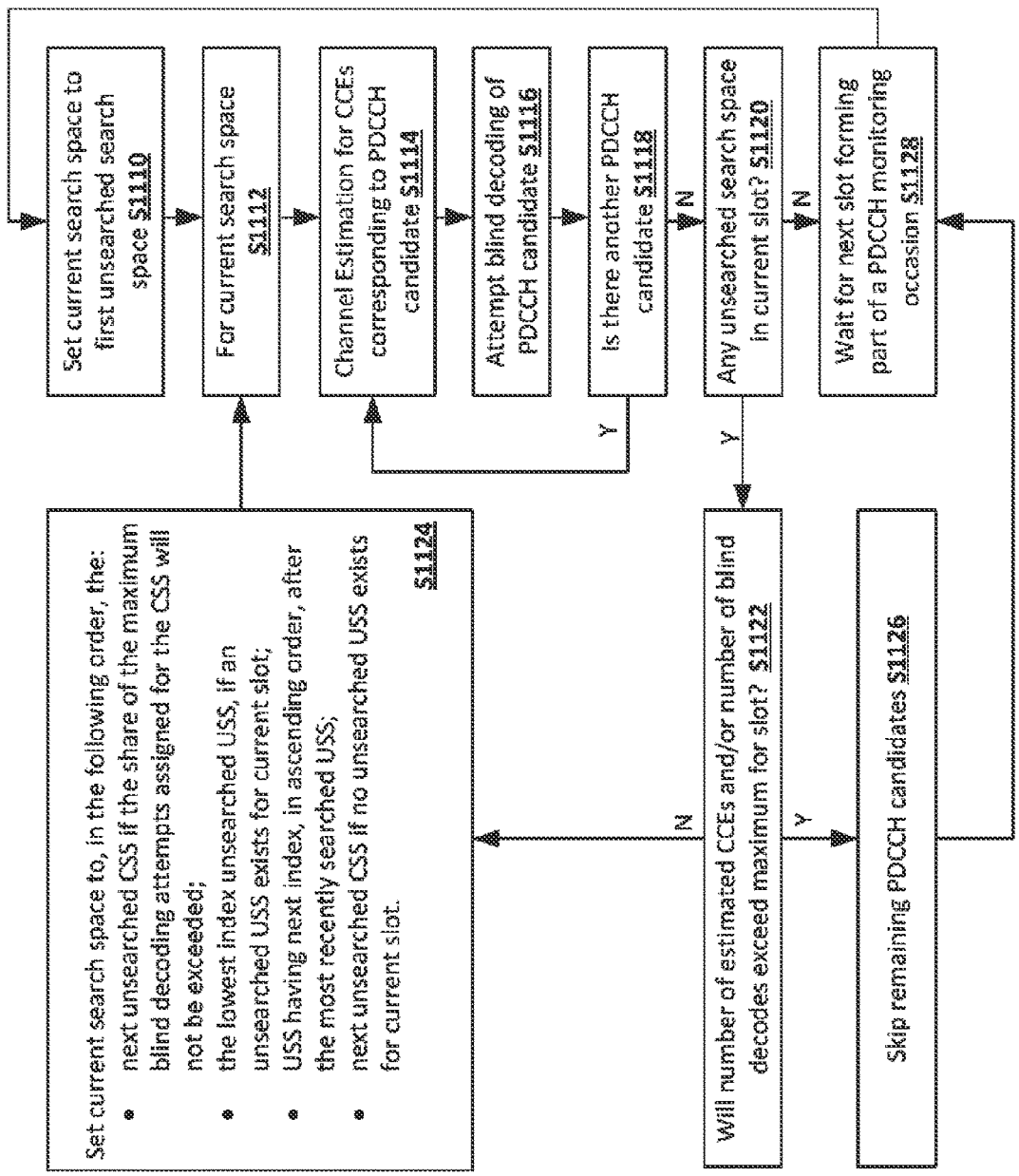
FIG. 11 is a simplified flow diagram illustrating another procedure which may be performed by a UE in the telecommunication system of FIG. 1.

FIG. 11 is a simplified flow diagram illustrating a procedure which may be performed by a UE 3, in the telecommunication system 1 of FIG. 1, for searching for control information in a plurality of search spaces using a shared PDCCH candidate prioritisation scheme.

In this example, the UE 3 may be preconfigured (or dynamically configured using RRC signalling or system information) with a parameter indicating how the maximum number of PDCCH candidates should be shared between CSSs and USSs. This may simply be an information element indicating of a fraction or percentage of the maximum number of PDCCH candidates that may be searched for CSSs (or USSs).

As seen in FIG. 11 at the start of a given PDCCH monitoring occasion in a particular slot, the search space to be searched is initially set to the highest priority unsearched search space at S1110. Typically, where there is a CSS to be searched, this will be the highest priority CSS. As indicated at S1112, the procedure continues with this highest priority unsearched search space as the current search space.

The UE 3 will proceed to perform channel estimation for the CCEs of each PDCCH candidate of the current search space at S1114, and then attempt to blind decode that PDCCH candidate at S1116, in turn as long as there is still another unsearched PDCCH candidate for the current search space at S1118.

When there is no longer an unsearched PDCCH candidate at S1118 the UE 3 determines whether there are any more unsearched search space sets for the current slot at S1120. If an unsearched search space still exists at S1120 then the UE 3 checks, at S1122 if searching that search space will result in the maximum number of channel estimated CCEs and/or maximum number of blind decodes being exceeded at S1122. If searching can continue without exceeding the maximum number of channel estimated CCEs and/or maximum number of blind decodes at S1122, then the UE 3 sets the current search space to be searched to the next highest priority search space at S1124, before repeating the procedure for the new current search space from S1112 to S1124 until either all the search spaces have been searched at S1120 or the searching cannot continue without exceeding the maximum number of channel estimated CCEs and/or maximum number of blind decodes at S1122.

In S1124 the priority of the search spaces is determined in accordance with the following order:
- An unsearched CSS is deemed to have the highest priority, if an unsearched CSS exists for current slot and the share of the maximum blind decoding attempts configured for the CSS will not be exceeded by searching that CSS.
- If the maximum blind decoding attempts configured for the CSS will be exceeded by searching that CSS, then the USS with the lowest index is deemed to have the deemed next highest priority.

The USSs are then prioritised in order of ascending index from the most recently searched USS until the highest index USS has been searched.

If every USS has been searched then any unsearched CSS can be searched provided that doing so will not cause the maximum number of channel estimated CCEs and/or maximum number of blind decodes to be exceeded at S1122.

If the searching cannot continue without exceeding the maximum number of channel estimated CCEs and/or maximum number of blind decodes at S1122, then the remaining PDCCH candidates are skipped at S1126.

When the remaining PDCCH candidates are skipped at S1126, or if the search spaces have all been searched at S1120, the UE 3 waits at S1128 for the next slot of the current (or next) PDCCH monitoring occasion before repeating the procedure starting at S1110.

It will be appreciated that this represents just one example of how a shared PDCCH candidate based prioritisation scheme may be used for determining the order in which search spaces should be monitored. It will also be appreciated that this could be used in conjunction with the reassignment of the highest priority USS from slot to slot as described with reference to FIG. 10.

Partial Searching of a Search Space

Figure 12:
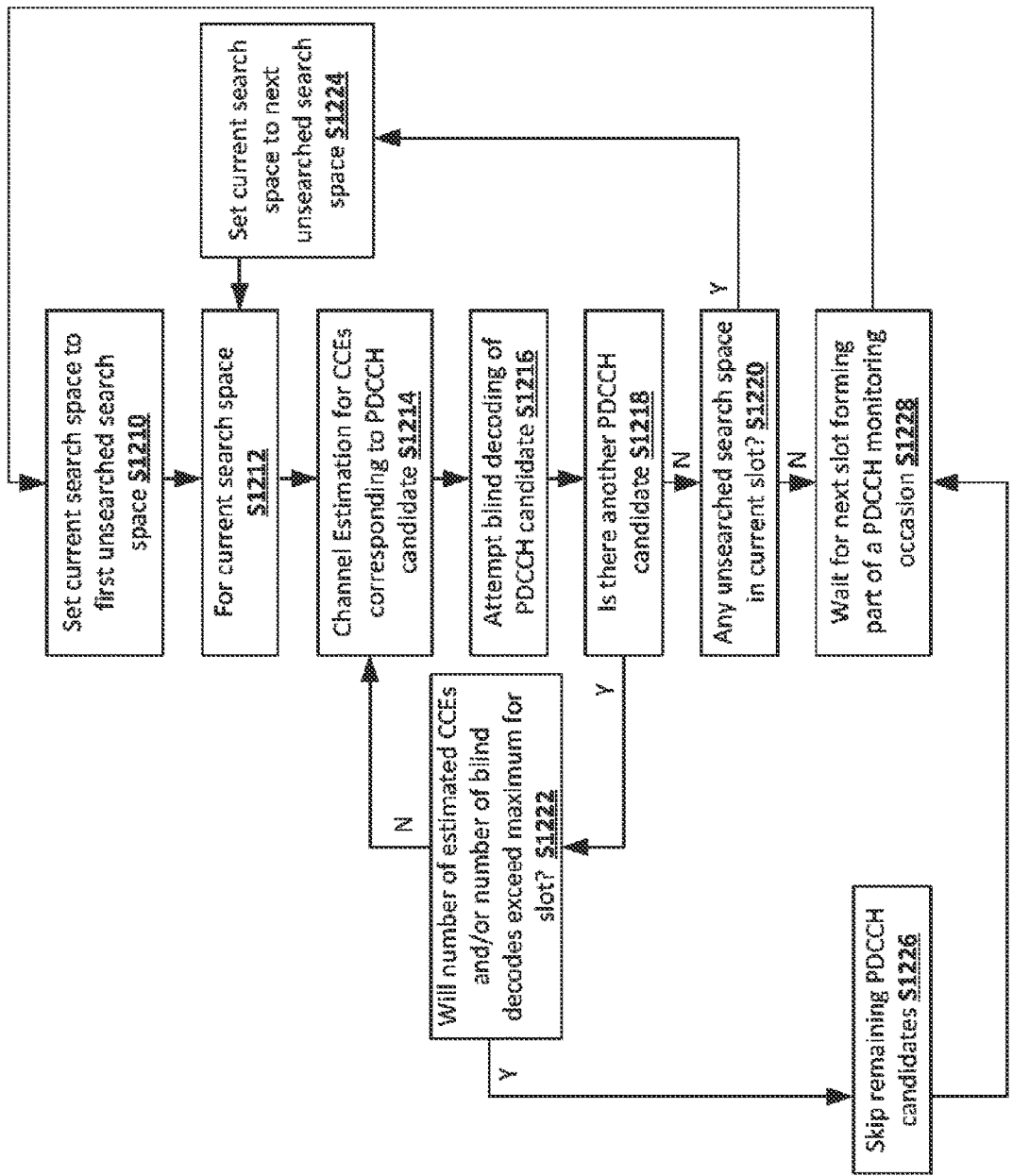
FIG. 12 is a simplified flow diagram illustrating another procedure which may be performed by a UE in the telecommunication system of FIG. 1.

FIG. 12 is a simplified flow diagram illustrating a procedure which may be performed by a UE 3, in the telecommunication system 1 of FIG. 1, for facilitating a partial search for control information in a search space (e.g., a USS).

As seen in FIG. 12 at the start of a given PDCCH monitoring occasion in a particular slot, the search space to be searched is initially set to the highest priority unsearched search space at S1210. Typically, where there is a CSS to be searched, this will be the highest priority CSS. As indicated at S1212, the procedure continues with this highest priority unsearched search space as the current search space.

The UE 3 will proceed to perform channel estimation for the CCEs of each PDCCH candidate of the current search space at S1214, and then attempt to blind decode that PDCCH candidate at S1216, in turn as long as there is still another unsearched PDCCH candidate for the current search space at S1218 and the maximum number of channel estimated CCEs and/or maximum number of blind decodes has not been reached at S1222.

When there is no longer an unsearched PDCCH candidate at S1218 the UE 3 determines whether there are any more unsearched search space sets for the current slot at S1220. If an unsearched search space still exists at S1220 then the UE 3 sets the current search space to be searched to the next highest priority search space at S1224, before repeating the procedure for the new current search space from S1212 to S1224 until either all the search spaces have been searched at S1220 or the searching cannot continue without exceeding the maximum number of channel estimated CCEs and/or maximum number of blind decodes at S1222.

In S1224 the priority of the search spaces may be based on the standard rules in which CSSs are prioritised over USSs and USSs are prioritised in order of ascending USS index. Nevertheless, it will be appreciated that the procedure of FIG. 12 could be modified to incorporate the USS priority cycling approach in which the highest priority USS is reassigned from slot to slot as described with reference to FIG. 10. It will also be appreciated that the procedure of FIG. 12 could be modified to incorporate the shared PDCCH candidate approach in which the PDCCH candidates are shared between CSSs and USSs as described with reference to FIG. 11.

If the searching cannot continue without exceeding the maximum number of channel estimated CCEs and/or maximum number of blind decodes at S1222, then the remaining PDCCH candidates are skipped at S1226 even if the current search space has not been fully searched.

When the remaining PDCCH candidates are skipped at S1226, or if the search spaces have all been searched at S1220, the UE 3 waits at S1228 for the next slot of the current (or next) PDCCH monitoring occasion before repeating the procedure starting at S1210.

It will be appreciated that this represents just one example of how a partial search space searching mechanism may be implemented.

Discontinuous PDCCH Monitoring

The mechanism for discontinuous PDCCH monitoring will now be described by way of example only, with reference to FIG. 13 which illustrates PDCCH monitoring during monitoring opportunities for the telecommunication system 1 of FIG. 1.

In order to know when to search for control information the UEs 3 are configured to determine a PDDCH monitoring occasion, typically comprising a plurality of slots, within which it should search for the control information. This starting slot of each monitoring occasion is determine based on a number of parameters configured by the base station 5 at the UE 3 (e.g., the parameters defining the search spaces). These parameter include: a PDDCH monitoring periodicity of $k_s$ slots; a PDDCH monitoring offset of $o_s$ slots; a PDDCH monitoring pattern indicating the first symbol(s) of a CORE-SET within a slot for POOCH monitoring; and a duration of $T_s$ ($<k_s$) slots indicating a number of slots for which the search space set extends.

Specifically, for a given search space s, a PDDCH monitoring occasion is determined to exist within a given slot (of number $N_{s,f}^{\mu}$) of a given frame (of number $n_f$) if $(N_f \cdot N_{slot}^{frame,\mu} + N_{s,f}^{\mu} - o_s) \bmod k_s = 0$ (where $N_{slot}^{frame,\mu}$ is a number of slots per frame for the current SCS configuration $\mu$). The UE monitors PDDCH candidates for search space set s for $T_s$ consecutive slots, starting from the slot $n_{s,f}^{\mu}$ and does not monitor PDCCH candidates for search space set s for the next $k_s - T_s$ consecutive slots.

Figure 13:
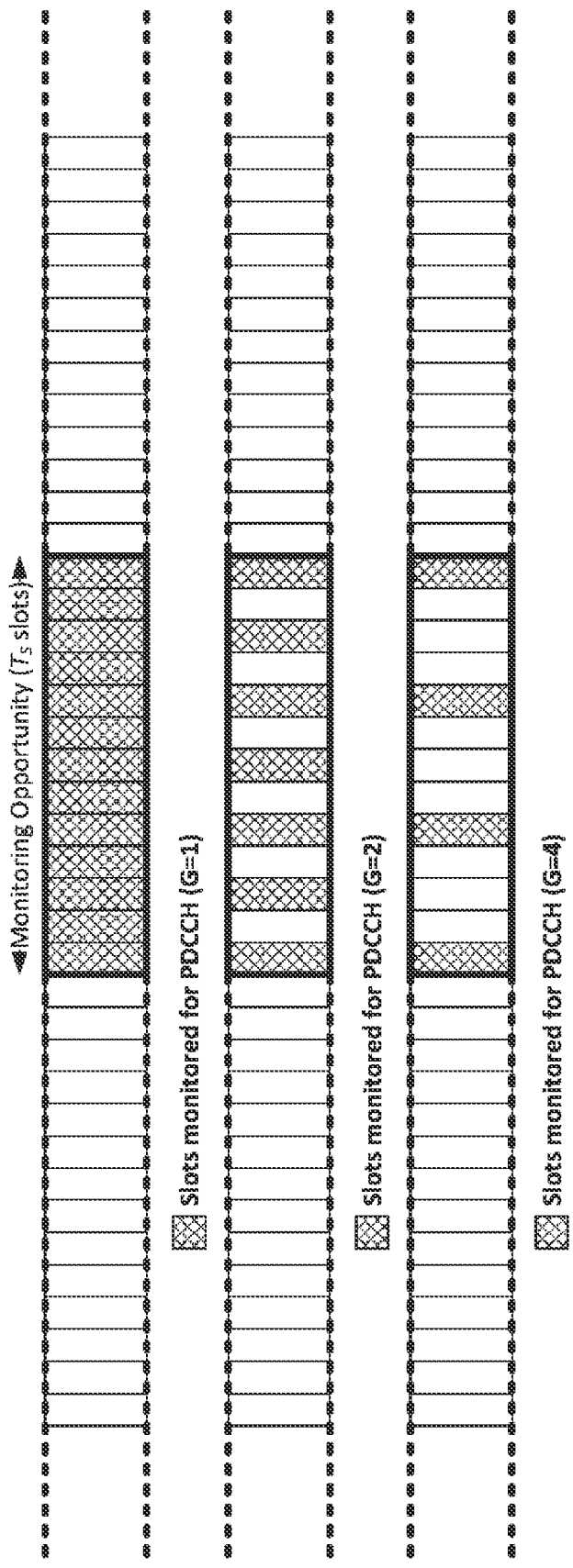
FIG. 13 illustrates PDCCH monitoring during monitoring opportunities for the telecommunication system of FIG. 1.

As seen in FIG. 13, in the telecommunication system 1, the UEs 3 are configurable to be able to monitor one slot every G slots sot of the $T_s$ consecutive slots where G is a configurable 'monitoring regularity' parameter or the like for indicating the how often the slots of a monitoring occasion should be monitored.

As seen in FIG. 13, the parameter G may be set to an integer value representing a number of slots selected from a set of integer values (e.g., G {1, 2, 4, ... }). The second and each subsequent consecutive value, in ascending order, in the set of integer values may beneficially be double the preceding value. This beneficially allows the regularity with which the slots of a monitoring occasion are monitored to be scaled, based on the numerology $\mu$ in use, with higher G values generality being use for higher values of $\mu$.

The parameter G may be implicitly configured based on the configured numerology or may be explicitly configure by the base station 5 using RHO signalling. For example, the parameter G may be implicitly linked to the numerology $\mu$ by means of a table, or mathematical function, which provides a mapping between each numerology $\mu$ and a corresponding value of the parameter G.

Whilst use of a configurable parameter such as G provides greater flexibility to modify the regularity with which slots are monitored for a PDCCH within a given monitoring occasion, the UEs 3 may be configurable either to monitor the slots consecutively, or to monitor every other slot of the $T_s$ consecutive slots.

Modifications and Alternatives

Detailed examples of various improvements have been described above. As those skilled in the art will appreciate, a number of modifications and alternatives can be made to the above examples whilst still benefiting from the inventions embodied therein.

For example, it will be appreciated that, whilst the new and beneficial features of the devices of the telecommunication network have been described, in particular, with reference to 5G/NR communication technology, the beneficial features may be implemented in the devices of a telecommunication system that uses other communication technologies such as, for example, other communication technologies developed as part of the 3GPP. For example, whilst the base station and UEs have been described as a 5G base station (gNB) and corresponding UEs it will be appreciated that the features described above may be applied to the RAN nodes (eNBs) and UEs that implement LTE/LTE-Advanced communication technology, or RAN nodes and UEs that implement other communications technologies developed using 3GPP derived communication technologies.

It will be appreciated that the various improvements described above have particular utility when implemented as appropriate in REDCAP UEs and in base stations and other apparatus for supporting REDCAP UEs. Nevertheless, the improvements may also be implemented in non-REDCAP UEs and related apparatus to provide similar benefits.

In the above examples, the base station uses a 3GPP radio communications (radio access) technology to communicate with the UE. However, any other radio communications technology (i.e., WLAN, Wi-Fi, WiMAX, Bluetooth, etc.) can be used between the base station and the UE in accordance with the above example embodiments. The above example embodiments are also applicable to 'non-mobile' or generally stationary user equipment.

In the above description, the UEs and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the UE as a signal over a computer network, or on a recording medium. Further, the functionality performed by part or all of this software may be performed using one or more dedicated hardware circuits. However, the use of software modules is preferred as it facilitates the updating of the base station or the UE in order to update their functionalities.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g., control, data and/or address buses); direct memory access (DMA) functions; hardware or software implemented counters, pointers and/or timers; and/or the like. Various other modifications will be apparent to those skilled in the art and will not be described in further detail here.

The base station may comprise a 'distributed' base station having a central unit 'CU' and one or more separate distributed units (DUs).

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table. This list is not exhaustive and is intended to be indicative of some examples of machine-type communication applications.

TABLE 7

| Service Area | MTC applications |
| --- | --- |
| Security | Surveillance systems |
| | Backup for landline |
| | Control of physical access (e.g., to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |

TABLE 7-continued

| Service Area | MTC applications |
| --- | --- |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and example embodiments are not limited to the above-described UE and various modifications can be made thereto.

Various other modifications will be apparent to those skilled in the art and will not be described in further detail here.

(Supplementary Note 1)

A method performed by a user equipment (UE) that communicates with a radio access network in a communication system, the method comprising:

receiving, from the radio access network, first information for configuring at least one set of control resources in which the radio access network may transmit control information, and second information for configuring at least one search space within the set of control resources within which to search for control information;

monitoring for downlink control information (DCI) transmitted by the radio access network within the at least one search space within the at least one set of control resources;

receiving, from the radio access network, DCI comprising third information for reconfiguring the at least one set of control resources configured by the first information, or the at least one search space configured by the second information; and monitoring for DCI transmitted by the radio access network within the at least one search space within the set of control resources as reconfigured by the third information;

wherein the third information is configured to provide an indication of at least one set of control resources configured by the first information, or of at least one search space configured by the second information, within which the UE is to stop monitoring for DCI, start monitoring for DCI, or continue monitoring for DCI.

(Supplementary Note 2)

A method as noted in supplementary note 1 wherein the indication the third information comprises a bitmap wherein each bit of the bitmap represents a respective set of control resources configured by the first information or at least one respective search space configured by the second information, optionally where a bit of a bitmap is set to '0' to indicate that the UE is to stop monitoring for DCI, and to '1' to indicate that the UE is start monitoring for DCI, or continue monitoring for DCI.

(Supplementary Note 3)

A method as noted in supplementary note 1 or 2 wherein the UE is operating in a discontinuous reception (DRX) mode and receives the third information during whilst in an inactive state during a DRX cycle.

(Supplementary Note 4)

A method as noted in supplementary note 3 wherein the UE receives the third information, whilst in an inactive state during an OFF period of the DRX cycle, in a field of a DCI format that is receivable during the OFF period of the DRX cycle.

(Supplementary Note 5)

A method as noted in supplementary note 4 wherein the third information is received in a field of DCI format 2_6, optionally a wake-up signal (WUS) field of DCI format 2_6.

(Supplementary Note 6)

A method as noted in supplementary note 3 wherein the UE receives the third information during whilst in an inactive state during an ON period of the DRX cycle.

(Supplementary Note 7) A method as noted in supplementary note 3 or 6 wherein the third information is received in a field of DCI format 0_1 or DCI format 1_1, optionally a code block group (CBG) transmission information (CBGTI) field of DCI format 0_1 or DCI format 1_1.

(Supplementary Note 8)

A method as noted in any of supplementary notes 1 to 7 wherein the UE stores information identifying a maximum number of search space sets that can be simultaneously monitored by the UE, wherein the information is configurable to any of a plurality of different values.

(Supplementary Note 9)

A method as noted in any of supplementary notes 1 to 8 wherein the first information for configuring at least one set of resources for receiving and/or the second information for configuring at least one is received using radio resource control (RRC) signalling.

(Supplementary Note 10)

A method performed by a user equipment (UE) that communicates with a radio access network in a communication system, the method comprising:

obtaining information for mapping each of a plurality of possible power saving configurations to a set of parameters that characterise that power configuration; and providing, to the radio access network, UE assistance information comprising an indication of at least one power saving configuration, of the plurality of power saving configurations, that represents a configuration or capability of the UE.

(Supplementary Note 11)

A method as noted in supplementary note 10 wherein the information for mapping each of a plurality of possible power saving configurations to a set of parameters that characterise that power configuration respectively comprises at least one index representing each power saving configuration, and wherein the indication of at least one power saving configuration comprises the respective at least one index corresponding to each of the at least one power saving configuration.

(Supplementary Note 12)

A method as noted in supplementary note 10 or 11, wherein the information for mapping each of a plurality of possible power saving configurations to a set of parameters that characterise that power configuration comprises at least one table.

(Supplementary Note 13)

A method as noted in any of supplementary notes 10 to 12, wherein the set of parameters that characterise that power configuration comprises at least one parameter from the following list of parameters: at least one parameter for use in configuring a search space; at least one parameter for use in configuring a monitoring occasion within which the UE is to monitor for control information; at least one parameter indicating a maximum number of blind decoding attempts supported by the UE; at least one parameter indicating a maximum number of physical downlink control channel (PDCCH) candidates per aggregation level supported at the UE; at least one parameter indicating a maximum number of control channel elements (CCEs) for channel estimation supported at the UE; at least one parameter indicating a corresponding aggregation level supported at the UE; at least one parameter indicating a maximum number of configurable search space sets supported at the UE; at least one parameter indicating a maximum number of simultaneously monitored search space sets supported at the UE; at least one parameter representing an expected UE battery life; at least one parameter representing a reference bit rate requirement for the UE; at least one parameter representing a peak bit rate requirement for the UE; and at least one parameter representing a latency requirement for the UE.

(Supplementary Note 14)

A method performed by a user equipment (UE) that communicates with a radio access network in a communication system, the method comprising:

monitoring, during a monitoring occasion, for downlink control information (DCI) transmitted by the radio access network within a plurality of search spaces, comprising at least one common search space (CSS) and at least on UE specific search space (USS), within at least one set of control resources;

wherein the set of control resources comprise at least one control channel element and each search space comprises a respective set of physical downlink control channel (PDCCH) candidates within which to search for DCI;

wherein the monitoring comprises, during a current slot of the monitoring occasion:

(a) treating a first search space of the plurality of search spaces that has not been searched in the current slot as a current search space and attempting to blind decode each PDCCH candidate of the current search space in turn until an end to searching of the current search space is triggered;
(b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and
(c) when an end to searching in the current slot is triggered, repeating steps (a) to (c) during a subsequent slot of a monitoring occasion as the current slot, until an end to searching in the monitoring occasion is triggered;
wherein, before performing step (b), at least one USS is assigned to be a highest priority USS for the current slot;
wherein, when selecting a search space to be searched next in step (b) the UE prioritises the remaining search spaces that have not been searched in the current slot based on based on a prioritisation scheme that requires that USSs are prioritised starting from a USS having a highest priority; and
wherein the method further comprises, before repeating steps (a) to (c) during a subsequent slot of the monitoring occasion, reassigning a different USS to be highest priority USS.

(Supplementary Note 15)

A method as noted in supplementary note 14 wherein, when selecting a search space to be searched next in step (b), after prioritising USS having a highest priority, the USSs are prioritised in ascending order of USS index until the USS having the highest USS index is reached, and then in ascending order of USS index from the USS having the lowest USS index if not already searched in the current slot.

(Supplementary Note 16)

A method as noted in supplementary note 14 or 15 wherein, when reassigning a different USS to be the highest priority USS, the UE: reassigns the highest priority to the USS that has the next USS index, in ascending order, to the USS index of the current highest priority USS when a higher index USS has not been searched in the current slot; and reassigns the highest priority to the USS to the USS having the lowest USS index, if not already searched in the current slot, when the current highest priority USS is the highest index USS.

(Supplementary Note 17)

A method performed by a user equipment (UE) that communicates with a radio access network in a communication system, the method comprising:
monitoring, during a monitoring occasion, for downlink control information (DCI) transmitted by the radio access network within a plurality of search spaces, comprising at least one common search space (CSS) and at least on UE specific search space (USS), within at least one set of control resources;
wherein the set of control resources comprise at least one control channel element (CCE) and each search space comprises a respective set of physical downlink control channel (PDCCH) candidates within which to search for DCI, each PDCCH candidate comprising at least one CCE;
wherein the monitoring comprises, during a current slot of the monitoring occasion:
(a) treating a first search space of the plurality of search spaces that has not been searched in the current slot as a current search space and attempting to blind decode each PDCCH candidate of the current search space in turn until an end to searching of the current search space is triggered;
(b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and
(c) when an end to searching in the current slot is triggered, repeating steps (a) to (c) during a subsequent slot of a monitoring occasion as the current slot, until an end to searching in the monitoring occasion is triggered;
wherein, the UE is configured with a maximum number of blind decode attempts, and an end to searching in the current slot is triggered when the maximum number of blind decode attempts will be exceeded if searching continues;
wherein, the UE is configured with a maximum share of the maximum number of blind decode attempts that can be used for searching CSSs; and
wherein, when selecting a search space to be searched next in step (b) the UE prioritises the remaining search spaces that have not been searched in the current slot based on a prioritisation scheme that requires that CSSs that have not been searched in the current slot are prioritised until further searching in a CSS will cause the maximum share of the maximum number of blind decode attempts to be exceeded, after which USSs that have not been searched in the current slot are prioritised.

(Supplementary Note 18)

A method performed by a user equipment (UE) that communicates with a radio access network in a communication system, the method comprising:
monitoring, during a monitoring occasion, for downlink control information (DCI) transmitted by the radio access network within a plurality of search spaces, comprising at least one common search space (CSS) and at least on UE specific search space (USS), within at least one set of control resources;
wherein the set of control resources comprise at least one control channel element (CCE) and each search space comprises a respective set of physical downlink control channel (PDCCH) candidates within which to search for DCI, each PDCCH candidate comprising at least one CCE;
wherein the monitoring comprises, during a current slot of the monitoring occasion:
(a) treating a first search space of the plurality of search spaces that has not been searched in the current slot as a current search space and attempting to blind decode each PDCCH candidate of the current search space in turn until an end to searching of the current search space is triggered;
(b) when the current search space has been fully searched, and the plurality of search spaces include at least one remaining search space that has not been searched in the current slot, selecting a remaining search space that has not been searched in the current slot to be searched next and repeating steps (a) and (b) with the selected search space as the current search space, unless an end to searching in the current slot is triggered; and (c) when an end to searching in the current slot is triggered, repeating steps (a) to (c) during a subsequent slot of a monitoring occasion as the current slot, until an end to searching in the monitoring occasion is triggered; wherein, the UE is configured with a maximum number of blind decode attempts, and an end to searching in the current search space and the current slot is triggered when the maximum number of blind decode attempts will be exceeded if searching continues, even when the current search space has not been fully searched.

(Supplementary Note 19)

A method performed by a user equipment (UE) that communicates with a radio access network in a communication system, the method comprising:
 identifying a sequence of consecutive slots for forming a monitoring occasion; and
 monitoring, during the monitoring occasion, for downlink control information (DCI) transmitted by the radio access network within a plurality of search spaces, within at least one set of control resources;
 wherein, when performing the monitoring, the UE monitors for control information in slots of the sequence of consecutive slots that are spaced apart by an unmonitored interval of at least one other slot of the sequence of consecutive slots.

(Supplementary Note 20)

A method as noted in supplementary note 19 wherein the communication system has a plurality of different numerologies that can be used for communication, each numerology having a different respective subcarrier spacing and slot length, and wherein the unmonitored interval is determined based on at least one configuration parameter that is determined based on the numerology of the communications system that is being used for communication.

(Supplementary Note 21)

A user equipment (UE) for communicating with a radio access network in a communication system, the UE comprising:
 a controller and a transceiver, wherein the controller is configured to control the transceiver to:
  receive, from the radio access network, first information for configuring at least one set of control resources in which the radio access network may transmit control information, and second information for configuring at least one search space within the set of control resources within which to search for control information;
  monitor for downlink control information (DCI) transmitted by the radio access network within the at least one search space within the at least one set of control resources;
  receive, from the radio access network, DCI comprising third information for reconfiguring the at least one set of control resources configured by the first information, or the at least one search space configured by the second information; and
  monitor for DCI transmitted by the radio access network within the at least one search space within the set of control resources as reconfigured by the third information;
 wherein the third information is configured to provide an indication of at least one set of control resources configured by the first information, or of at least one search space configured by the second information, within which the UE is to stop monitoring for DCI, start monitoring for DCI, or continue monitoring for DCI.

(Supplementary Note 22)

A user equipment (UE) for communicating with a radio access network in a communication system, the UE comprising:
 a controller and a transceiver, wherein the controller is configured:
  to obtain information for mapping each of a plurality of possible power saving configurations to a set of parameters that characterise that power configuration; and
  to control the transceiver to provide, to the radio access network, UE assistance information comprising an indication of at least one power saving configuration, of the plurality of power saving configurations, that represents a configuration or capability of the UE.

(Supplementary Note 23)

A user equipment (UE) for communicating with a radio access network in a communication system, the UE comprising:
 a controller and a transceiver, wherein the controller is configured to control the transceiver to:
  monitor, during a monitoring occasion, for downlink control information (DCI) transmitted by the radio access network within a plurality of search spaces, comprising at least one common search space (CSS) and at least on UE specific search space (USS), within at least one set of control resources;
 wherein the set of control resources comprise at least one control channel element and each search space comprises a respective set of physical downlink control channel (PDCCH) candidates within which to search for DCI;
 wherein the controller is configured to control the UE, during a current slot of the monitoring occasion, to:
  (a) treat a first search space of the plurality of search spaces that has not been searched in the current slot as a current search space and attempt to blind decode each PDCCH candidate of the current search space in turn until an end to searching of the current search space is triggered;
  (b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and
  (c) when an end to searching in the current slot is triggered, repeat steps (a) to (c) during a subsequent slot of a monitoring occasion as the current slot, until an end to searching in the monitoring occasion is triggered;
 wherein, before performing step (b), at least one USS is assigned to be a highest priority USS for the current slot;
 wherein the controller is configured to control the UE to, when selecting a search space to be searched next in step (b), prioritise the remaining search spaces that have not been searched in the current slot based on based on a prioritisation scheme that requires that USSs are prioritised starting from a USS having a highest priority; and wherein the controller is configured to control the UE to, before repeating steps (a) to (c) during a subsequent slot of the monitoring occasion, reassign a different USS to be highest priority USS.

(Supplementary Note 24)

A user equipment (UE) for communicating with a radio access network in a communication system, the UE comprising:

a controller and a transceiver, wherein the controller is configured to control the transceiver to:
monitor, during a monitoring occasion, for downlink control information (DCI) transmitted by the radio access network within a plurality of search spaces, comprising at least one common search space (CSS) and at least on UE specific search space (USS), within at least one set of control resources;

wherein the set of control resources comprise at least one control channel element and each search space comprises a respective set of physical downlink control channel (PDCCH) candidates within which to search for DCI;

wherein the controller is configured to control the UE, during a current slot of the monitoring occasion, to:
(a) treat a first search space of the plurality of search spaces that has not been searched in the current slot as a current search space and attempt to blind decode each PDCCH candidate of the current search space in turn until an end to searching of the current search space is triggered;
(b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and
(c) when an end to searching in the current slot is triggered, repeat steps (a) to (c) during a subsequent slot of a monitoring occasion as the current slot, until an end to searching in the monitoring occasion is triggered;

wherein, the UE is configured with a maximum number of blind decode attempts, and an end to searching in the current slot is triggered when the maximum number of blind decode attempts will be exceeded if searching continues;

wherein, the UE is configured with a maximum share of the maximum number of blind decode attempts that can be used for searching CSSs; and wherein the controller is configured to control the UE to, when selecting a search space to be searched next in step (b), UE prioritise the remaining search spaces that have not been searched in the current slot based on a prioritisation scheme that requires that CSSs that have not been searched in the current slot are prioritised until further searching in a CSS will cause the maximum share of the maximum number of blind decode attempts to be exceeded, after which USSs that have not been searched in the current slot are prioritised.

(Supplementary Note 25)

A user equipment (UE) for communicating with a radio access network in a communication system, the UE comprising:

a controller and a transceiver, wherein the controller is configured to control the transceiver to:
monitor, during a monitoring occasion, for downlink control information (DCI) transmitted by the radio access network within a plurality of search spaces, comprising at least one common search space (CSS) and at least on UE specific search space (USS), within at least one set of control resources;

wherein the set of control resources comprise at least one control channel element and each search space comprises a respective set of physical downlink control channel (PDCCH) candidates within which to search for DCI;

wherein the controller is configured to control the UE, during a current slot of the monitoring occasion, to:
(a) treat a first search space of the plurality of search spaces that has not been searched in the current slot as a current search space and attempt to blind decode each PDCCH candidate of the current search space in turn until an end to searching of the current search space is triggered;
(b) when the current search space has been fully searched, and the plurality of search spaces include at least one remaining search space that has not been searched in the current slot, select a remaining search space that has not been searched in the current slot to be searched next and repeat steps (a) and (b) with the selected search space as the current search space, unless an end to searching in the current slot is triggered; and
(c) when an end to searching in the current slot is triggered, repeat steps (a) to (c) during a subsequent slot of a monitoring occasion as the current slot, until an end to searching in the monitoring occasion is triggered;

wherein, the UE is configured with a maximum number of blind decode attempts, and an end to searching in the current search space and the current slot is triggered when the maximum number of blind decode attempts will be exceeded if searching continues, even when the current search space has not been fully searched.

(Supplementary Note 26)

A user equipment (UE) for communicating with a radio access network in a communication system, the UE comprising:

a controller and a transceiver, wherein the controller is configured to identify a sequence of consecutive slots for forming a monitoring occasion, and to control the transceiver to monitor, during the monitoring occasion, for downlink control information (DCI) transmitted by the radio access network within a plurality of search spaces, within at least one set of control resources;

wherein the controller is configured to control the UE to monitor for control information in slots of the sequence of consecutive slots that are spaced apart by an unmonitored interval of at least one other slot of the sequence of consecutive slots.

(Supplementary Note 27)

A method performed by a radio access network that communicates with a user equipment (UE) in a communication system, the method comprising:

transmitting, to the UE, first information for configuring at least one set of control resources in which the radio access network may transmit control information, and second information for configuring at least one search space within the set of control resources within which to search for control information; and transmitting, to the UE, from the radio access network, DCI comprising third information for reconfiguring the at least one set of control resources configured by the first information, or the at least one search space configured by the second information;

wherein the third information is configured to provide an indication of at least one set of control resources configured by the first information, or of at least one search space configured by the second information, within which the UE is to stop monitoring for DCI, start monitoring for DCI, or continue monitoring for DCI.

(Supplementary Note 28)

A method performed by a radio access network that communicates with a user equipment (UE) in a communication system, the method comprising:

obtaining information for mapping each of a plurality of possible power saving configurations to a set of parameters that characterise that power configuration;

receiving, from the UE, UE assistance information comprising an indication of at least one power saving configuration, of the plurality of power saving configurations, that represents a configuration or capability of the UE; and configuring communication with the UE based on the received UE assistance information.

(Supplementary Note 29)

A method performed by a radio access network that communicates with a user equipment (UE) in a communication system, the method comprising:

transmitting, to the UE, information for configuring at least one set of control resources in which the radio access network may transmit control information, and second information for configuring a plurality of search spaces, comprising at least on UE specific search space (USS), within at least one set of control resources, wherein the information comprises information for configuring a maximum share of a maximum number of blind decode attempts that can be used by the UE for searching a common search space (CSSs).

(Supplementary Note 30)

A method performed by a radio access network that communicates with a user equipment (UE) in a communication system, the method comprising:

transmitting, to the UE, information indicating a sequence of consecutive slots for forming a monitoring occasion, wherein the information comprises information for indicating an interval between slots of the sequence of consecutive slots that is to remain unmonitored by the UE.

(Supplementary Note 31)

A radio access network node for communicating with a user equipment (UE) in a communication system, the radio access network node comprising:

a controller and a transceiver, wherein the controller is configured to control the transceiver to:

transmit, to the UE, first information for configuring at least one set of control resources in which the radio access network may transmit control information, and second information for configuring at least one search space within the set of control resources within which to search for control information; and transmit, to the UE, from the radio access network, DCI comprising third information for reconfiguring the at least one set of control resources configured by the first information, or the at least one search space configured by the second information;

wherein the third information is configured to provide an indication of at least one set of control resources configured by the first information, or of at least one search space configured by the second information, within which the UE is to stop monitoring for DCI, start monitoring for DCI, or continue monitoring for DCI.

(Supplementary Note 32)

A radio access network node for communicating with a user equipment (UE) in a communication system, the radio access network node comprising:

a controller and a transceiver, wherein the controller is configured: to obtain information for mapping each of a plurality of possible power saving configurations to a set of parameters that characterise that power configuration; to control the transceiver to receive, from the UE, UE assistance information comprising an indication of at least one power saving configuration, of the plurality of power saving configurations, that represents a configuration or capability of the UE; and to configure communication with the UE based on the received UE assistance information.

(Supplementary Note 33)

A radio access network node for communicating with a user equipment (UE) in a communication system, the radio access network node comprising:

a controller and a transceiver, wherein the controller is configured to control the transceiver to transmit, to the UE, information for configuring at least one set of control resources in which the radio access network may transmit control information, and second information for configuring a plurality of search spaces, comprising at least on UE specific search space (USS), within at least one set of control resources, wherein the information comprises information for configuring a maximum share of a maximum number of blind decode attempts that can be used by the UE for searching a common search space (CSSs).

(Supplementary Note 34)

A radio access network node for communicating with a user equipment (UE) in a communication system, the radio access network node comprising:

a controller and a transceiver, wherein the controller is configured to control the transceiver to transmit, to the UE, information indicating a sequence of consecutive slots for forming a monitoring occasion, wherein the information comprises information for indicating an interval between slots of the sequence of consecutive slots that is to remain unmonitored by the UE.

This application is based upon and claims the benefit of priority from United Kingdom Patent Application No. 2012353.5, filed on Aug. 7, 2020, the disclosure of which is incorporated herein in its entirety by reference.

What is claimed is:

1. A method performed by a user equipment (UE), the method comprising:

receiving, from an access network node, a Radio Resource Control (RRC) message including information indicating:

a slot unit G as a power of two;

a duration of consecutive slots $T_s$; and a monitoring periodicity $k_s$ including the duration $T_s$ and an unmonitoring duration $k_s$-$T_s$; and monitoring a physical downlink control channel at monitoring slots determined per G slots during the consecutive slots $T_s$ of the duration.

2. The method according to claim 1, wherein the G corresponds to one of a plurality of numerologies that is being used for communication of the UE.

3. The method according to claim 1, wherein the higher G corresponds to the higher numerology.

4. A user equipment (UE), comprising:
a memory storing instructions; and
at least one processor configured to process the instructions to:
receive, from an access network node, a Radio Resource Control (RRC) message including information indicating:
a slot unit G as a power of two;
a duration of consecutive slots $T_s$; and
a monitoring periodicity $k_s$ including the duration $T_s$ and an unmonitoring duration $k_s$-$T_s$; and
monitor a physical downlink control channel at monitoring slots determined per G slots during the consecutive slots $T_s$ of the duration.

5. The UE according to claim 4, wherein the G corresponds to one of a plurality of numerologies that is being used for communication of the UE.

6. The UE according to claim 5, wherein the higher G corresponds to the higher numerology.

7. A method performed by an access network node, the method comprising:
transmitting, to a user equipment (UE), a Radio Resource Control (RRC) message including information indicating:
a slot unit G as a power of two;
a duration of consecutive slots $T_s$; and
a monitoring periodicity $k_s$ including the duration $T_s$ and an unmonitoring duration $k_s$-$T_s$; and
transmitting a physical downlink control channel at monitoring slots determined per G slots during the consecutive slots $T_s$ of the duration.

8. A radio access network node comprising:
a memory storing instructions; and
at least one processor configured to process the instructions to:
transmit, to a user equipment (UE), a Radio Resource Control (RRC) message including information indicating:
a slot unit G as a power of two;
a duration of consecutive slots $T_s$;
a monitoring periodicity $k_s$ including the duration $T_s$ and an unmonitoring duration $k_s$-$T_s$; and
transmit a physical downlink control channel at monitoring slots determined per G slots during the consecutive slots $T_s$ of the duration.

* * * * *